United States Patent
Shen et al.

(10) Patent No.: US 6,701,336 B1
(45) Date of Patent: Mar. 2, 2004

(54) SHARED GALOIS FIELD MULTIPLIER

(75) Inventors: Ba-Zhong Shen, Shrewsbury, MA (US); Lih-Jyh Weng, Shrewsbury, MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/439,774

(22) Filed: Nov. 12, 1999

(51) Int. Cl.$^7$ ................................................. G06F 7/00
(52) U.S. Cl. ......................................... 708/492; 380/28
(58) Field of Search ................................. 708/491–492, 708/605–606, 620–632; 380/28

(56) References Cited

U.S. PATENT DOCUMENTS

| | | | |
|---|---|---|---|
| 4,866,716 A | | 9/1989 | Weng |
| 5,107,503 A | | 4/1992 | Riggle et al. |
| 5,136,592 A | * | 8/1992 | Weng .......................... 714/762 |
| 5,381,423 A | * | 1/1995 | Turco .......................... 714/762 |
| 5,948,117 A | | 9/1999 | Weng et al. |
| 6,141,420 A | * | 10/2000 | Vanstone et al. ............ 708/492 |
| 6,148,430 A | * | 11/2000 | Weng .......................... 714/770 |
| 6,199,088 B1 | * | 3/2001 | Weng et al. ................. 708/492 |
| 6,230,179 B1 | * | 5/2001 | Dworkin et al. ............. 708/492 |
| 6,349,318 B1 | * | 2/2002 | Vanstone et al. ............ 708/492 |
| 6,366,941 B1 | * | 4/2002 | Wolf et al. .................. 708/492 |
| 6,374,383 B1 | | 4/2002 | Weng |

OTHER PUBLICATIONS

Richard E. Blahut "A Theory and Practice of Error Control Codes", Addison–Wesley Publishing Company, Reading MA, table of contents, chapter 4 pp. 65–92, chapter 5, pp. 93–129, and chapter 8 pp. 207–247 (1983).

Peterson et al., "Error–Correcting Codes, Second Edition", MIT Press, Cambridge, MA, London, England, table of contens, chapter 4 pp. 76–115, chapter 6 pp. 144–169, chapter 7 pp. 170–205, and chapter 8 pp. 206–265 (1972).

E.D. Mastrovito, "A VLSI Design for Multiplication Over Finite Field GF(2m)", Lecture Notes in Computer Science 357, pp. 297–309, Springer–Verlag, Berlin (Mar. 1989).

Berlekamp, "Algebraic Coding Theory", pp. 47–48, Academic Press (1968).

Wofl, "Efficient circuits for multiplying in GF($2^m$) for certain values of m", *Discrete Mathematics* 106/107:497–502 (1992).

* cited by examiner

*Primary Examiner*—Tan V. Mai
(74) *Attorney, Agent, or Firm*—Daly, Crowley & Mofford, LLP

(57) ABSTRACT

Two types of shared-field multipliers for performing multiplications on field elements of different sizes are presented. One type uses a "cyclic" Galois field GF($2^m$), that is, a Galois field GF($2^m$) generated by an irreducible polynomial $x^m+x^{m-1}+x^{m-2}+ \ldots +x+1$, and the other type uses a composite field structure. Each shared-field multiplier includes computation circuitry for receiving field elements as inputs, the computation circuitry being responsive to a control signal to perform computations based on the inputs having a first size to produce an output of the first size, or to perform computations based on the inputs having a second, different size to produce an output of the second size.

42 Claims, 18 Drawing Sheets

| | XOR | | AND | |
|---|---|---|---|---|
| | 10-bit | 12-bit | 10-bit | 12-bit |
| Gates | 110 | 156 | 121 | 169 |
| Delay | 4 | 4 | 1 | 1 |

| | XOR | AND | MUX |
|---|---|---|---|
| Gates | 156 | 181 | 12 |
| Delay | 4 | 1 | 1 |

$$\begin{bmatrix} c_0 \\ c_1 \\ c_2 \\ c_3 \\ c_4 \end{bmatrix} = a*b = \begin{bmatrix} a_0 & a_4 & a_3 & a_2 & d_1^{(5)} \\ a_1 & a_0 & a_4 & a_3 & a_2 \\ a_2 & d_1^{(5)} & d_2^{(5)} & d_3 & a_3 + d_1^{(5)} \\ a_3 & a_2 & d_1^{(5)} & d_2^{(5)} & d_3 \\ a_4 & a_3 & a_2 & d_1^{(5)} & d_2^{(5)} \end{bmatrix} \begin{bmatrix} b_0 \\ b_1 \\ b_2 \\ b_3 \\ b_4 \end{bmatrix}$$

*FIG. 8*

$$\begin{bmatrix} c_0 \\ c_1 \\ c_2 \\ c_3 \\ c_4 \\ c_5 \end{bmatrix} = a*b = \begin{bmatrix} a_0 & a_5 & a_4 & a_3 & d_4 & d_1^{(6)} \\ a_1 & a_0 & a_5 & a_4 & a_3 & d_4 \\ a_2 & a_1 & a_0 & a_5 & a_4 & a_3 \\ a_3 & d_4 & d_1^{(6)} & d_2^{(6)} & a_2 & a_1 \\ a_4 & a_3 & d_4 & d_1^{(6)} & d_2^{(6)} & a_2 \\ a_5 & a_4 & a_3 & d_4 & d_1^{(6)} & d_2^{(6)} \end{bmatrix} \begin{bmatrix} b_0 \\ b_1 \\ b_2 \\ b_3 \\ b_4 \\ b_5 \end{bmatrix}$$

*FIG. 9*

| | XOR | AND | MUX |
|---|---|---|---|
| Gates | 35 | 36 | 14 |
| Delay | 4 | 1 | 1 |

| | XOR | AND | MUX |
|---|---|---|---|
| Gates | 132 | 108 | 48 |
| Delay | 6 | 1 | 1 |

SHARED GALOIS FIELD MULTIPLIER

BACKGROUND OF THE INVENTION

The invention relates generally to error correcting systems and, more particularly, to error correcting systems which perform Galois field multiplication during encoding and decoding processes.

As storage systems migrate to longer sector sizes, error correcting codes (ECC) with longer block lengths are needed. One way to achieve format efficiency is to use different field element (e.g., symbol) sizes—smaller symbols for shorter sectors and larger symbols for longer sectors. Symbols of different sizes can share some frequently used field operations. For example, addition may be performed for differently sized symbols using exclusive-OR adders. Galois field multiplication, which multiplies two elements in a Galois field, is frequently used in error correction encoding and decoding hardware, such as Reed-Solomon encoders or decoders, but requires dedicated multiplier hardware for each different symbol size. Consequently, error correction systems having one type of Galois field multiplier to accommodate a symbol/sector size are incompatible with alternative symbol/sector sizes. Some well-known field multipliers are described in Berlekamp, Algebraic Coding Theory, Academic Press, 1968, at pps. 47–48, as well as Peterson and Weldon, Error Correction Codes, 2d Edition, MIT Press, 1972, at pps. 170–182.

SUMMARY OF THE INVENTION

This invention features a Galois field multiplier that can operate on field elements of more than one size.

Generally, in one aspect of the invention, a Galois field multiplier includes computation circuitry for receiving an input, the computation circuitry being responsive to a control signal to perform computations based on the input having a first size to produce an output of the first size, or to perform computations based on the input having a second, different size to produce an output of the second size.

Embodiments of the invention may include one or more of the following features.

The computation circuitry can include select circuitry, responsive to the control signal, for configuring the computation circuitry.

In one embodiment, the input can be an element of a Galois field $GF(2^m)$ of a cyclic type ("cyclic Galois field"), that is, having a generator polynomial of the form $x^m+x^{m-1}+x^{m-2}+\ldots+x+1$, and the computation circuitry can further include shifting circuitry, coupled to and responsive to the select circuitry, for performing a cyclic shifting of bits of the input.

The first size can be 10 bits and the associated input an element of the cyclic Galois field $GF(2^{10})$. The second size can be 12 bits and the associated input an element of the cyclic Galois field $GF(2^{12})$. The shifting circuitry can further include a plurality of shifting units connected in parallel, a first one of the shifting units for receiving input values for the input and cyclically shifting the input values, each next consecutive one of the other shifting units receiving a cyclically shifted output from a previous one of the shifting units and cyclically shifting the cyclically shifted output.

The input can be a first input and the computation circuitry can receive a second input of the same size as the first input. The field multiplier can further include: a plurality of AND gates, each of the AND gates coupled to a value of the second input, a least significant one of the AND gates coupled to the received input values of the first input, a next most significant one of the AND gates coupled to cyclically shifted output of the first one of the shifting units, and each next most significant one of the AND gates coupled to and receiving a cyclically shifted output from the next consecutive one of the other shifting units to form product values; and a plurality of Galois field adders, one adder for each input value, each adder for receiving one of the product values for a corresponding one of the input values from each of the AND gates, for producing a set of multiplier output values of the output.

In another embodiment, the input can be a first input and the computation circuitry can receive a second input having the same size as the first input. The first and second inputs of the Galois field multiplier can each be elements of an extended Galois field $GF((2^m)^k)$ over a field $GF(2^m)$. In this alternative embodiment, the computation circuitry can be implemented to compute the product of the first and second inputs using the Karatsuba-Ofman algorithm and can further include a plurality of base multipliers coupled to the control line, each of the base multipliers for taking the multiplications over the field $GF(2^m)$. Each of the plurality of base multipliers can include base multiplier computation circuitry for receiving base multiplier inputs to produce base multiplier outputs, the base multiplier computation circuitry being adapted to respond to the control signal.

The shared-field multiplier of the invention offers several advantages. First, it performs the job of at least two dedicated multiplier circuits with reduced hardware complexity by exploiting common attributes of multiplication operations in different fields. Second, the shared-field multiplier allows ECC systems to satisfy different sector length requirements with flexibility and efficiency. ECC systems designed for a first symbol size may be compatible with and can therefore be upgraded to a second symbol size as sector and ECC block formats change.

Other features and advantages of the invention will be apparent from the following description taken together with the claims.

BRIEF DESCRIPTION OF THE DRAWINGS

FIG. 8 is a depiction of the multiplication of two $GF(2^5)$ field elements.

FIG. 9 is a depiction of the multiplication of two $GF(2^6)$ field elements.

DETAILED DESCRIPTION

Figure 1:
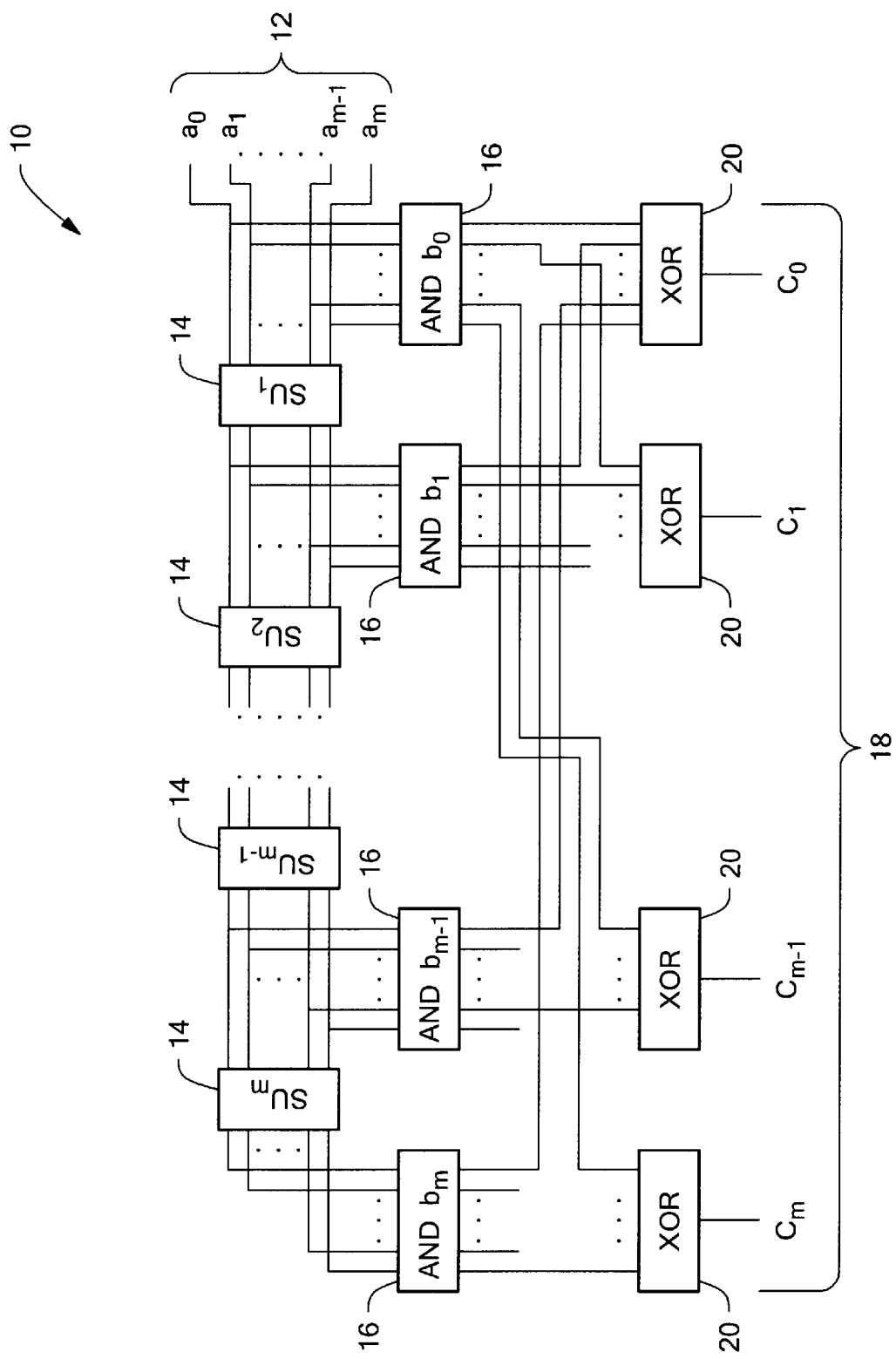
FIG. 1 is a schematic diagram of a single field multiplier having shifting units for cyclically shifting inputs.

Referring to FIG. 1, a single field multiplier 10 designed for the Galois field $GF(2^m)$ is used to perform multiplication operations on field elements, such as error correction code symbols. The single field multiplier 10 receives first input values (or multiplicand) $a_0$ through $a_m$ 12, at a first one of a plurality of parallel-connected consecutive shifting units ("SU") $SU_1$, $SU_2$, $SU_3$, . . . , (or more generally, "shifting circuitry" 14). The first SU, $SU_1$, shifts the received input values by one place. Each subsequent, consecutive one of the shifting units 14 then shifts previously shifted input values received from a previous shifting unit by one place. A set of AND logic circuits 16 for ANDing the first input values with a second input or second input values (multiplier) $b_0$ through $b_m$ are also provided. Each of the AND gates 16 is coupled to and therefore corresponds to a different value of the second input, from least significant to most significant. A first one of the AND gates 16 corresponding to the least significant second input value ($b_0$) is coupled to each of the received first input values. A next most significant one of the AND gates 16 having $b_1$ as input is coupled to shifted first input values as provided at the output of the first SU, $SU_1$, and each next most significant one of the AND gates 16 is similarly coupled to the output of a corresponding next consecutive one of the shifting units in the shifting circuitry 14. The results of each AND circuit 16 for each of the input values are exclusive-ORed with the results of every other AND circuit 16 for corresponding ones of the input values by XOR circuits 20 to produce output values $c_0$ through $c_m$ 18. Although the multiplier is an m-bit field multiplier, for reasons which will be made apparent in the discussion to follow, it requires m+1 input/output lines (as shown).

The single field multipler 10 has a cyclic property, that is, it operates on a $GF(2^m)$ field generated by an irreducible polynomial of the form $x^m+x^{m-1}+x^{m-2}+\ldots+x^2+x+1$. These cyclic-type fields will be referred to herein as "cyclic Galois fields". This type of "cyclic" single field multiplier is described in a co-pending U.S. application Ser. No. 08/786,894, entitled "Modified Reed-Solomon Error Correction System Using (W+I+1)-Bit Representations of Symbols of $GF(2^{W+I})$," in the name of Weng et al., incorporated herein by reference. For further discussion of fields of the cyclic type, reference may be had to a paper by Jack Keil Wolf entitled, "Efficient Circuits for Multiplying in $GF(2^m)$ for Certain Values of m," Discrete Mathematics 106/107, Elsevier Science Publishers B.V. 1992, at pps. 497–502. For a discussion of cyclic codes and their properties, see pages 206–268 of the above-referenced book by Peterson and Weldon.

Two fields which belong to the cyclic class of field multipliers are $GF(2^{10})$ and $GF(2^{12})$. The 10-bit field $GF(2^{10})$ can be generated by the irreducible polynomial $$r_{10}(x)=1+x+x^2+x^3+x^4+x^5+x^6+x^7+x^8+x^9+x^{10} \quad (1)$$

and the 12-bit field $GF(2^{12})$ can be generated by the irreducible polynomial $$r_{12}(x)=1+x+x^2+x^3+x^4+x^5+x^6+x^7+x^8+x^9+x^{10}+x^{11}+x^{12}. \quad (12)$$

Every element in the field $GF(2^m)$ (where m=10, 12) can be represented by two m+1-bit symbols, for example, $A_1=(a_{1,0}, a_{1,1}, \ldots a_{1,m-1}, 0)$ and $A_2=(a_{2,0}, a_{2,1}, \ldots, a_{2,m-1}, 1)$, such that the compliment of $A_1$ is equal to $A_2$, and vice versa. If two such elements in the field $GF(2^m)$ are represented as $A(x)=\text{sum}(i=0, \ldots, 1) a_i x^i$ and $B(x)=\text{sum}(i=0, \ldots, m) b_i x^i$, then the multiplication of the elements $A(x)$ and $B(x)$ may be expressed as $$A(x)B(x) \bmod(x^{m+1}+1). \quad (3)$$

Thus, for i=0, Eq. (3) is reduced to $x^0[a_0+a_1x+a_2x^2+\ldots, +a_9x^9+a_{10}x^{10}]*b_0$. For i=1, Eq. (3) becomes $x[a_0+a_1x+a_2x^2+\ldots+a_9x^9+a_{10}x^{10}]*b_1 \bmod(x^{m+1}+1)$, which can be represented as $[a_0x+a_1x^2+a_2x^3+\ldots+a_9x^{10}+a_{10}x^{11}]*b_1 \bmod(x^{m+1}+1)$ and is equal to $[a_{10}+a_0x+a_1x^2+a_2x^3+\ldots+a_9x^{10}]*b_1$. Therefore, one cyclic shift of $A(x)$ is $xA(x)$, or $(a_{10}, a_0, a_1, \ldots, a_9)$, two cyclic shifts is $x^2A(x)$, or $(a_9, a_{10}, a_o, a_1, \ldots a_8)$, and so forth.

Another way of representing the product $A(x)*B(x)$, then, is as $b_oA(x)+b_1xA(x)+b_2x^2A(x)+\ldots+b_{10}x^{10}A(x)$. Still referring to FIG. 1, the first product term "$b_oA(x)$" has no shifts; the second product term "$b_1xA(x)$" corresponds to one shift of $A(x)$ as performed by $SU_1$; the third product term "$b_2x^2A(x)$" corresponds to two shifts of $A(x)$ as performed by $SU_2$; and each next term corresponds to a next higher shift number, with the final product term "$b_{10}x^{10}A(x)$" corresponding to ten shifts of $A(x)$, as performed by $SU_{10}$.

Figures 2, 3:
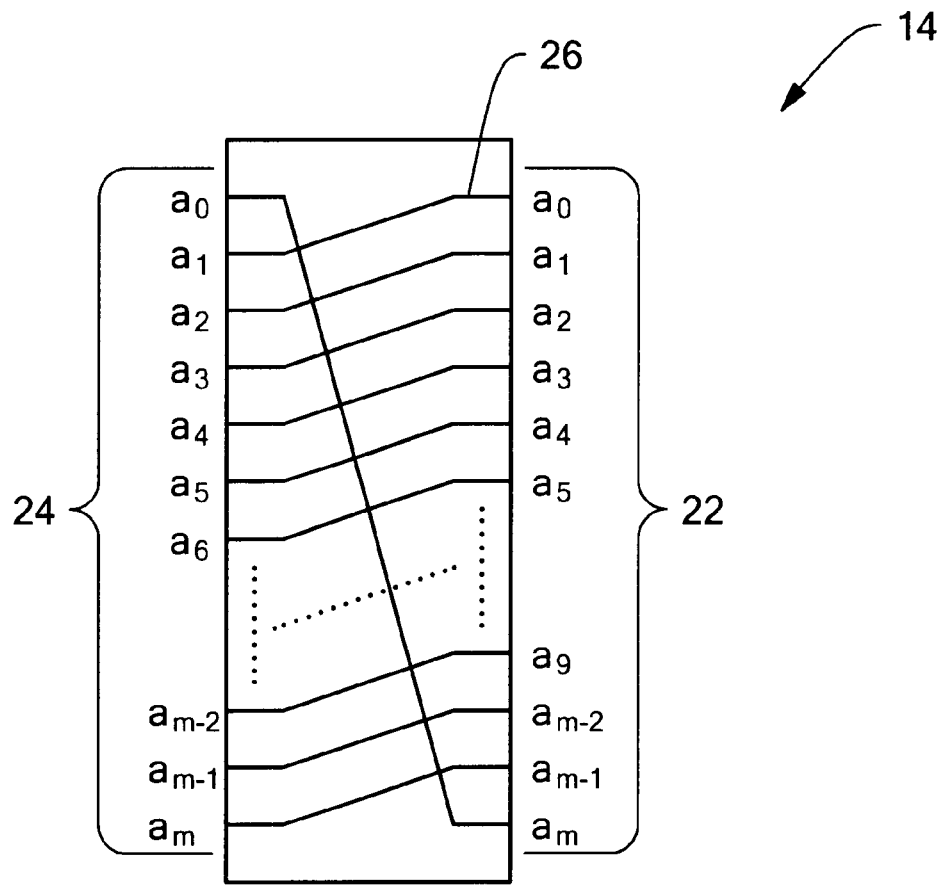
FIG. 2 is a detailed diagram of the shifting units of FIG. 1.
FIG. 3 is table depicting logic complexity and delay associated with the single field multiplier shown in FIG. 1.

Referring to FIG. 2, the shifting circuitry 14 corresponding to each of the identical shifting units $SU_1$, $SU_2$, . . . , $SU_{m-1}$, $SU_m$, is shown. The shifting circuitry 14 has shifting unit input values 22 and shifting output values 24 interconnected by cross-connect lines 26. As can be seen from the figure, each of the inputs values $a_o$ through $a_m$ (where $a_o$, $a_2$, $a_3$, . . . , $a_m$ may be bits of a field element, e.g., code word symbol or polynomial coefficient) "shifts" one place to a next higher position (i.e., next MSB position), until the mth input value, which cyclically shifts to the lowest (or LSB) position. For example, the shifting unit input value $a_0$ is connected to the shifting unit output value $a_1$ (an output of the shifting unit, but an input to the subsequent shifting unit), and the shifting input value $a_1$ is similarly shifted to the shifting unit output value $a_2$. The last shifting unit input value $a_m$ is cyclically shifted to the shifting unit output value $a_o$. Consequently, if the shifting unit 14 in FIG. 2 is the first unit, $SU_1$, then the once shifted $A(x)$ provided by $SU_1$ to $SU_2$ is again shifted by the second unit $SU_2$. That is, the $a_o$ and $a_m$ values that were shifted to $a_1$ and $a_0$, respectively, by $SU_1$, are now shifted to $a_2$ and $a_1$, respectively, by $SU_2$.

The logic gate (XOR, AND) count and associated gate delay for both a 10-bit (m=10) and a 12-bit (m=12) implementation of the single field multiplier 10 (FIG. 1) are illustrated in FIG. 3. For a 10-bit implementation, the total number of gates (XOR and AND gates) is 231. The associated delay is 5. For the 12-bit implementation, the total number of gates is 325 and the associated delay is 5.

Figure 4:
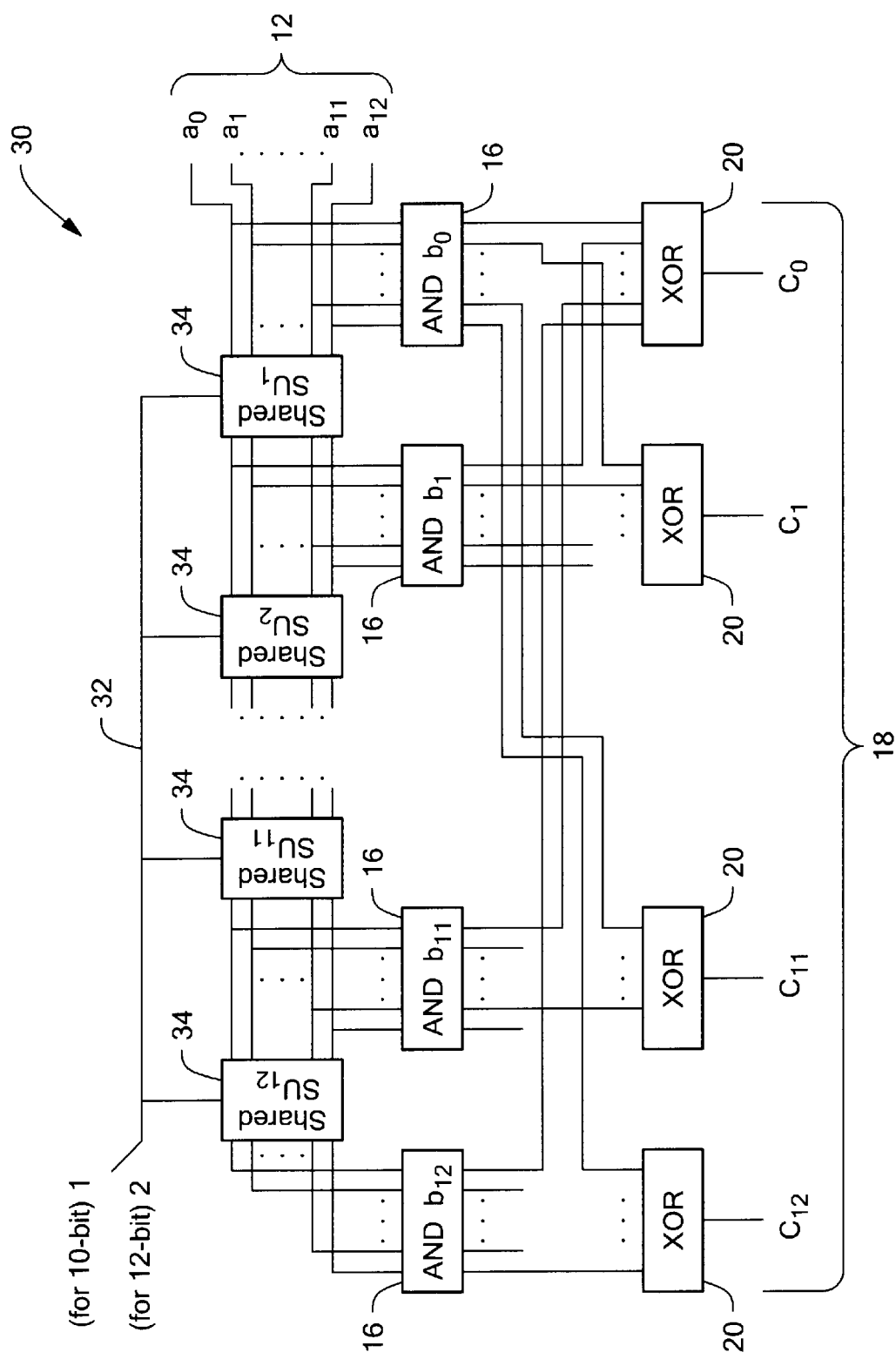
FIG. 4 is a shared field multiplier having shared shifting units for cyclically shifting as inputs either 10-bit or 12-bit symbols.

Referring to FIG. 4, a shared field multiplier 30 shared by 10-bit and 12-bit fields is shown. As the shared field multiplier 30 includes many of the same components included in the single field multiplier 10 of FIG. 1, like reference numerals are used to indicate like elements. In contrast to the single field multiplier 10, which can only be used for one particular field, the shared-field multiplier 30 is adapted for control by a control line 32, which directs the multiplier 30 to operate on a first symbol size, e.g., 10-bits, or a second symbol size, e.g., 12-bits. The control line 32 is user-set (via, e.g., external control software, not-shown) to a predetermined position corresponding to the desired symbol size. In the present embodiment, one predetermined position selects a 10-bit symbol size and an alternate position selects a 12-bit symbol size. For each position or setting, the control line 32 controls the selection of circuitry within shared shifting units $SU_1$, $SU_2$, $SU_3$, . . . , $SU_{12}$ 34, referred to collectively as "shared shifting circuitry".

Figures 5, 6:
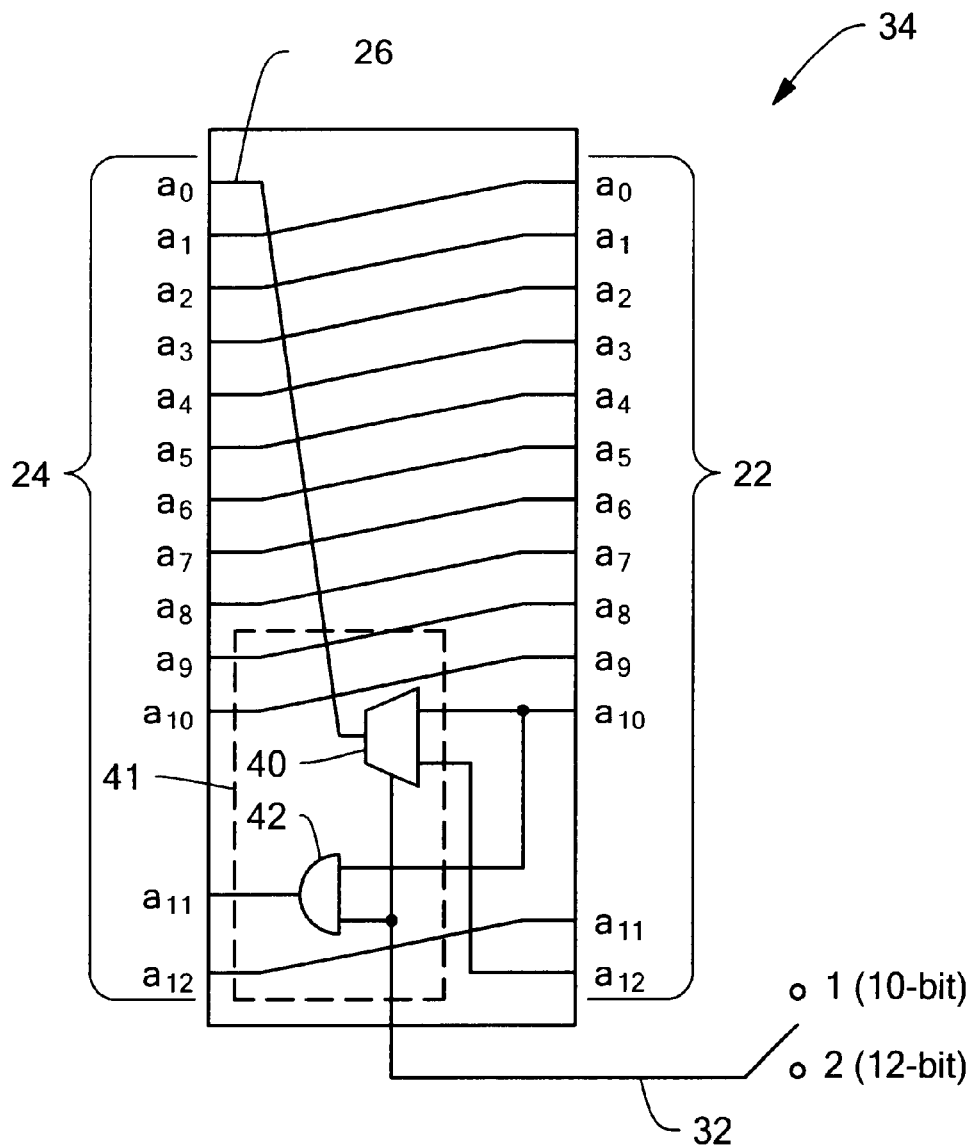
FIG. 5 is a detailed diagram of the shared shifting units of FIG. 1.
FIG. 6 is table depicting logic complexity and delay associated with the shared-field multiplier shown in FIG. 4.

With reference to FIG. 5, each shared shifting unit 34 includes a first logic device 40 shown as a multiplexer (MUX) and a second logic device 42 shown as an AND gate. Collectively, these logic devices are referred to as select circuitry 44. The select circuitry 44 is coupled to ones of the shared shifting unit's internal cross-connect (shifting) lines to direct the selection of shifting operations for each symbol size. Essentially, the select circuitry 44 configures the SU to either a 10-bit SU or as 12-bit SU in accordance with the control signal 32.

The MUX 40 receives as inputs $a_{10}$ and $a_{12}$, and the control line 32 as a select line. The output of the MUX 40 is connected to $a_o$. The input $a_{10}$ is also an input to the AND gate 42, which has as a second input the control line 32. When the control line 32 is in a first state (position "1", corresponding to a logic "0", for 10-bit), $a_{11}$–$a_{12}$ are not used and $a_{10}$, is connected to $a_0$. When the control line 32 is in a second state (position "2", corresponding to a logic "1", for 12-bit), the $a_{12}$ input is connected to the $a_o$ output. The $a_{10}$ input is shifted to the $a_{11}$ output via AND gate 42. The $a_{11}$ input is connected to the $a_{12}$ value at the output of the shared shifting unit 14.

Thus, by replacing the shifting units 14 in FIG. 1 with the shared shifting units 34 controlled by the control line 32 of FIG. 4, a shared field multiplier for both fields $GF(2^{10})$ and $GF(2^{12})$ is obtained. The total gate count and delay needed for the shared-field multiplier 30 of FIG. 4 is depicted in FIG. 6. In comparing the shared field multiplier 30 to the single 12-bit field multiplier 10, it can be appreciated that the gate count increases by only an additional twelve AND gates and twelve multiplexers (MUX), that is, one extra AND gate and MUX for each of the SUs, and the total delay is increased by one extra MUX delay. Therefore, the total increase in gate count for the share field multiplier is no more than 9%. However, the total delay time for the shared multiplier is 20% greater than that of the single field multiplier.

The cyclic shared field multiplier 30 described above must be operated with 13 bits. Therefore, the entire ECC system within which such a shared-field multiplier operates has to be carried out with 13-bit symbols, increasing the overall gate count of the ECC system as a result.

Other embodiments are contemplated. For example, the shared multiplier may be implemented using a composite (or "extended") field structure. Because the composite field requires 12 bits only, overall gate count is reduced from that of the cyclic implementation. However, the latency associated with the composite field implementation may be more than that of the cyclic shared-field multiplier of FIG. 4.

Extended Galois fields are known and well-defined. The earlier-mentioned Peterson and Weldon book, at p. 155, defines an extension field in the following manner: "A field formed by taking polynomials over a field F modulo an irreducible polynomial p(X) of degree k is called an extension field of degree k over F." Thus, the $GF(2^5)$ field may be extended to the $GF((2^5)^2)$ field, that is, the $GF(2^{10})$ field, using a polynomial p(x) of degree 2, such as $x^2+a_1x+a_0$, which is irreducible over $GF(2^5)$, such that $a_1$, $a_0$ are elements of $GF(2^5)$. Likewise, taking a primitive element $\alpha_6=(3)_8$, the $GF(2^6)$ field may be extended to $GF(2^{12})$ using the polynomial $p(x)=x^2+x+\alpha_6^{42}$, which is irreducible over $GF(2^6)$.

Consider A(x) and B(x) as elements of the field $GF(2^{10})$, where $A(x)=A_1x+A_0$ and $B(x)=B_1x+B_0$, and $A_1$, $A_0$ and $B_1$, $B_0$ are elements of the $GF(2^5)$ field. Multiplication of elements $A=(A_1, A_0)$ and $B=(B_1, B_0)$ in $GF(2^{10})$ can be calculated by the Karatsuba-Ofman algorithm $$A \otimes B = (D+(A_0*B_0), (A_0*B_0)+(A_1*B_1)) \qquad (4)$$

where $A_i$, $B_i \epsilon GF(2^5)$ and $D=(A_0+A_1)*(B_0+B_1)$.

Similarly, the multiplication of two field elements $A=(A_1, A_0)$ and $B=(B_1, B_0)$ in $GF(2^{12})$ can be calculated by $$A \otimes B = (D+(A_0*B_0), (A_0*B_0)+(A_1*(B_1*\alpha_6^{42})) \qquad (5)$$

where $A_i$, $B_i \epsilon GF(2^6)$ and $D=(A_0+A_1)*(B_0+B_1)$. Since $\alpha_6^{42}=(10)_8$, then $$B_1 * \alpha_6^{42} = (b_{1,0}, \ldots b_{1,5}) * \alpha_6^{42} = (b_{1,3}, b_{1,4}, b_{1,5}, b_{1,3}+b_{1,0}, b_{1,4}+b_{1,1}, b_{1,5}+b_{1,2}). \qquad (6)$$

Eq. (6) can be obtained for $GF(2^6)$ using the multiplication illustrated in FIG. 9, as described below.

The operation of Eqs. (4) and (5) is simplified by reducing the product A(x)*B(x) modulus p(x), where p(x) is an irreducible polynomial of $GF(2^m)$ of degree k, and therefore may be derived in the following manner:

$$A(x)*B(x)=A(x)B(x) \bmod p(x)=(A_1x+A_0)(B_1x+B_0) \bmod p(x)=A_1B_1x^2+(s+A_1B_1+A_0B_0)x+A_0B_0 \bmod p(x)$$

where $s=(A_1+A_0)(B_1+B_0)=A_1B_1+A_1B_0+A_0B_1+A_0B_0$

Figure 7:
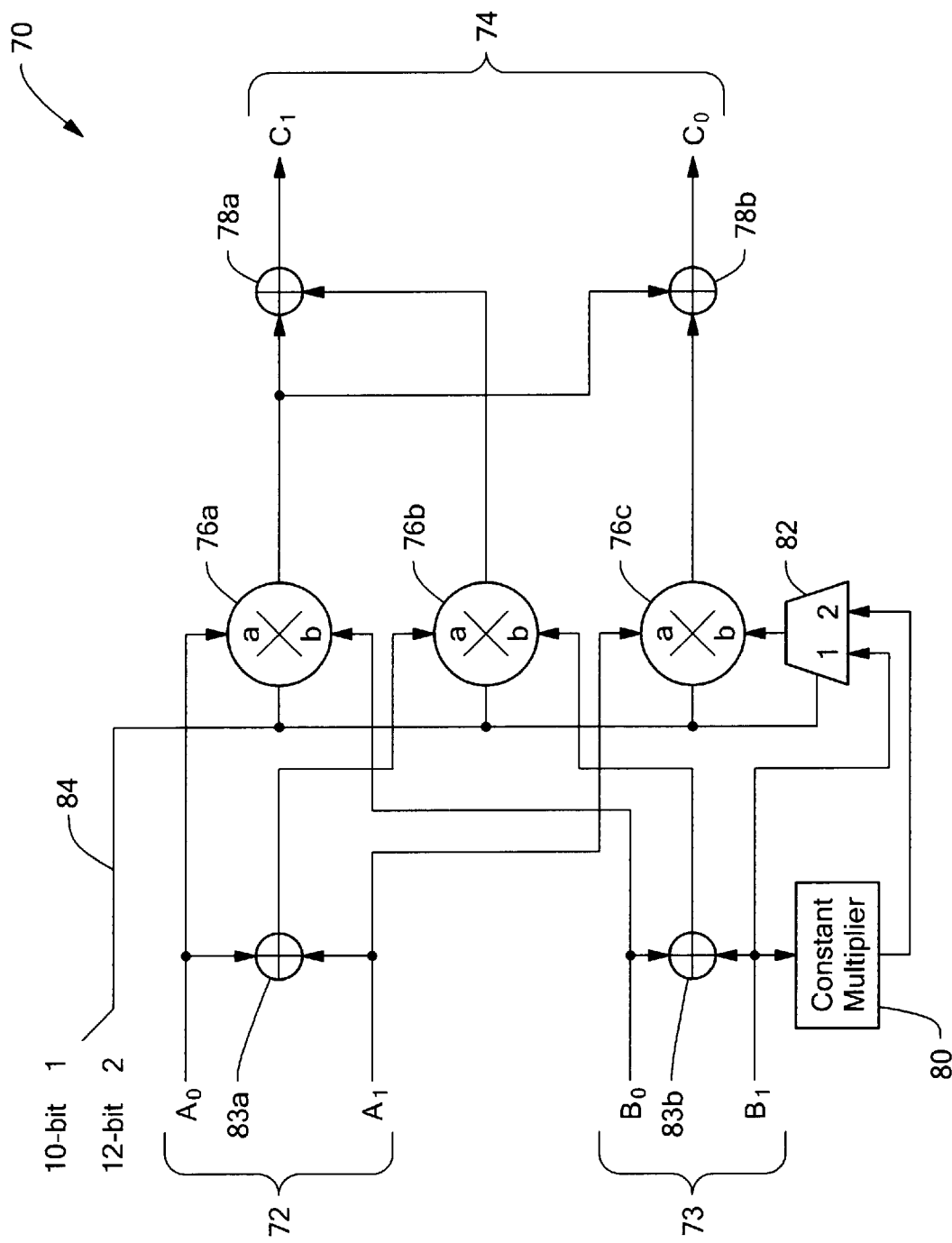
FIG. 7 is a schematic diagram of a composite shared field multiplier.

Letting $A_0B_0=D_0$, $A_1B_1=D_1$, $s=D2$, $s_2=D_1$, $s_1=D_2+D_1+D_0$, and $s_0=D_0$, and using $p(x)=x^2+p_1x+p_o$ (where $x^2 \bmod x^2+p_1x+p_0=p_1x+p_0$) for $GF(2^{10})$ and $GF(2^{12})$, then $$A(x)*B(x)=s_2x^2+s_1x+s_0 \bmod p(x)$$

where $p(x)=x^2+p_1x+p$ $$0=(s_2x^2+s_1x+s_0) \bmod x^2+p_1x+p$$

$$0=s_2p_1x+s_2p_0+s_1x+s$$

$$0=(s_2p_1+s_1)x+(s_2p_o+s$$

$$0)=(s_2+s_1)x+(s_2+s_0) \text{ if } GF(2^{10})$$

where $(s_2+s_1)=D_1+D_2+D_1+D_0=D_2+D_0=C_1$ where $(s_2+s_0)=D_1+D_0=C$ $$0=(s_2+s_1)x+(s_2\alpha^{42}+s_0) \text{ if } GF(2^{12})$$

where $(s_2+s_1)=C_1$ where $(s_2\alpha^{42}+s_0)=C_0$ where $\alpha^{42}$ is a constant multiplier Based on the composite structure property discussed above, along with the equations (4) and (5), a shared field multiplier 70 for GF($2^{10}$) and GF($2^{12}$) is implemented as shown in FIG. 7. Referring to FIG. 7, the shared field multiplier 70 includes inputs (multiplicand) $A_0$ and $A_1$ 72, (multiplier) $B_0$ and $B_1$ 73, and output values (product) $C_0$ and $C_1$ 74. Further included are base multipliers 76a, 76b, 76c (more generally, 76), output adders 78a and 78b, a constant multiplier 80, a constant multiplier select 82, input adders 83a, 83b and a control line 84. The control line 84 is connected to each of the base multipliers 76 and the constant multiplier select 82. The base multiplier 76a receives as inputs $A_0$ and $B_0$. The base multiplier 76b receives as inputs $A_0+A_1$ (as summed by input adder 83a) and $B_0+B_1$ (as summed by the input adder 83b). The base multiplier 76c receives as inputs $A_1$ and the output of the constant multiplier select 82, which, under the control of the control line 84, selects the input $B_1$ in 10-bit mode and the output of the constant multiplier (i.e., $B_1\alpha^{42}$ 80 in 12-bit mode). The products generated by the base multipliers 76a and 76c are exclusive-ORed by the output adder 78b to produce output value $C_0$. The products of the base multipliers 76a and 76b are exclusive-ORed by the output adder 78a to produce output value $C_1$.

The base multipliers 76 of the shared-field multiplier 70 are implemented as shared field multipliers for GF($2^5$) and GF($2^6$). With a 5-bit field GF($2^5$) generated by the primitive polynomial $x^5+x^2+1$, multiplication of two field elements $a=(a_0, \ldots, a_4)$ and $b=(b_0, \ldots, b_4)$ can be calculated using a multiplication algorithm known as the Mastrovito algorithm, illustrated in FIG. 8. With reference to FIG. 8, $d_1^{(5)}=a_1+a_4$, $d_2^{(5)}=a_0+a_3$ and $d_3=a_2+a_4$. For a detailed description of the Mastrovito multiplier algorithm, reference may be had to a paper by E. D. Mastrovito, entitled "VLSI Design for Multiplication Over Finite Field GF($2^m$)," Lecture Notes in Computer Science 357, pp. 297–309, Springer-Verlag, Berlin, March 1989.

Similarly, for the field GF($2^6$), which can be generated with an irreducible polynomial $x^6+x^3+1$, multiplication of two field elements $a=(a_0, \ldots, a_5)$ and $b=(b_0, \ldots, b_5)$ of GF($2^6$) can be calculated by the multiplication operation (again, using the Mastrovito multiplier algorithm) shown in FIG. 9, where $d_1^{(6)}=a_1+a_4$, $d_2^{(6)}=a_0+a_3$ and $d_4=a_2+a_5$.

It is apparent from the calculations illustrated in FIGS. 8 and 9 that the field multipliers for GF($2^5$) and GF($2^6$) share the same $d_1$ and $d_2$ terms. Therefore, $d_1$ can be defined by $d_1=_{a1}+a_4$ and $d_2$ defined by $d_2=a_0+a_3$ for both of the multipliers.

Figure 10:
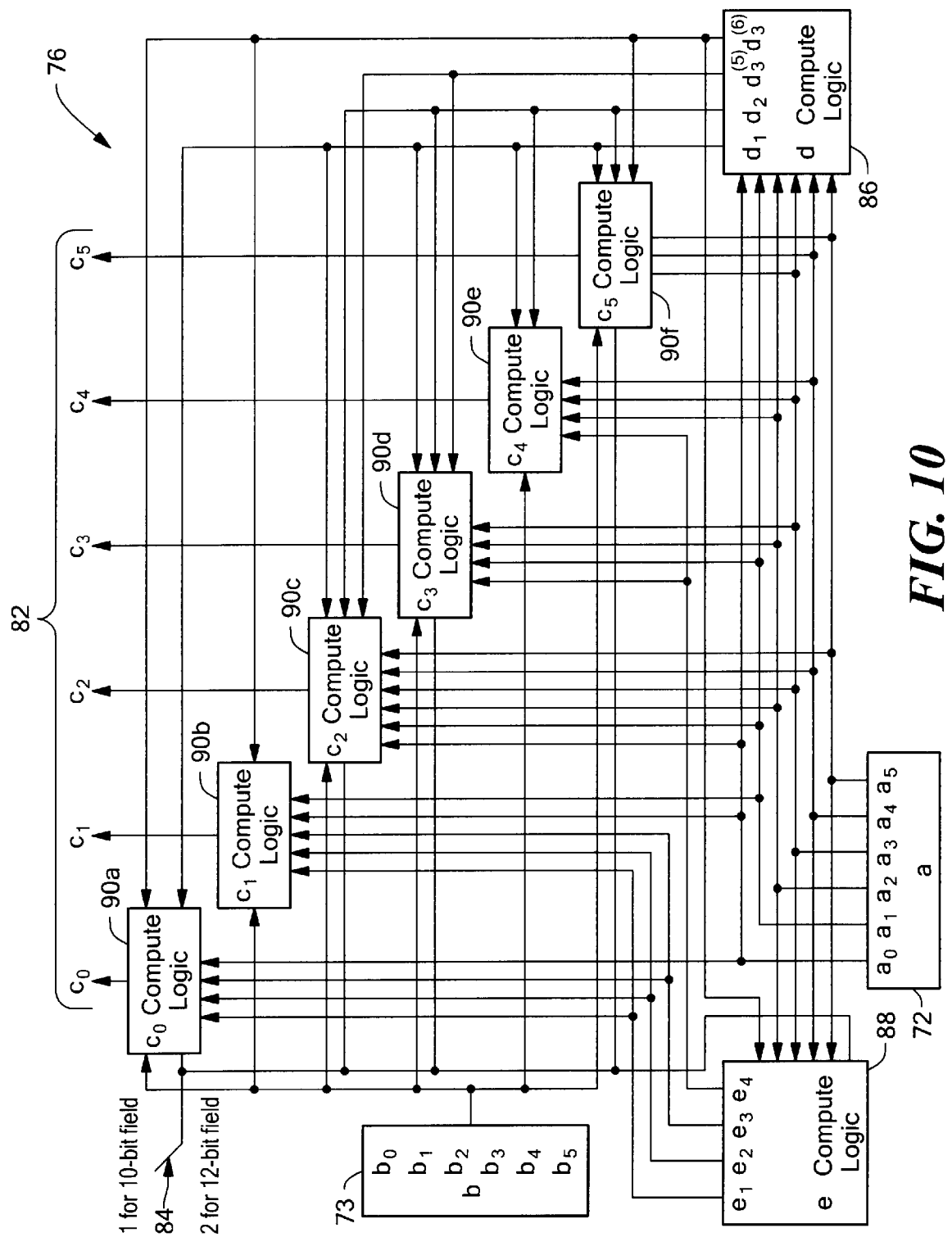
FIG. 10 is a block diagram of the base multiplier shown in FIG. 7.

Referring to FIG. 10, the base multiplier 76—a shared field multiplier for GF($2^5$) and GF($2^6$)—is based on the similarity of the two multiplications presented in FIGS. 8 and 9. Each base multiplier 76 includes the set of "a" inputs 72, the second set of "b" inputs 73, and a set of "c" outputs 82. Further included is a first compute circuit or "d compute logic" 86, a second compute circuit or "e compute logic" 88 and a third compute circuitry or "$c_i$-compute logic" (where I=0 to 5) 90. Note that the control line 84 (from FIG. 7) is coupled to the $c_o$ compute logic 90a, the $c_2$ compute logic 90c, the $c_3$ compute logic 90d, the $c_5$ compute logic 90f and the e compute logic 88.

Figure 11:
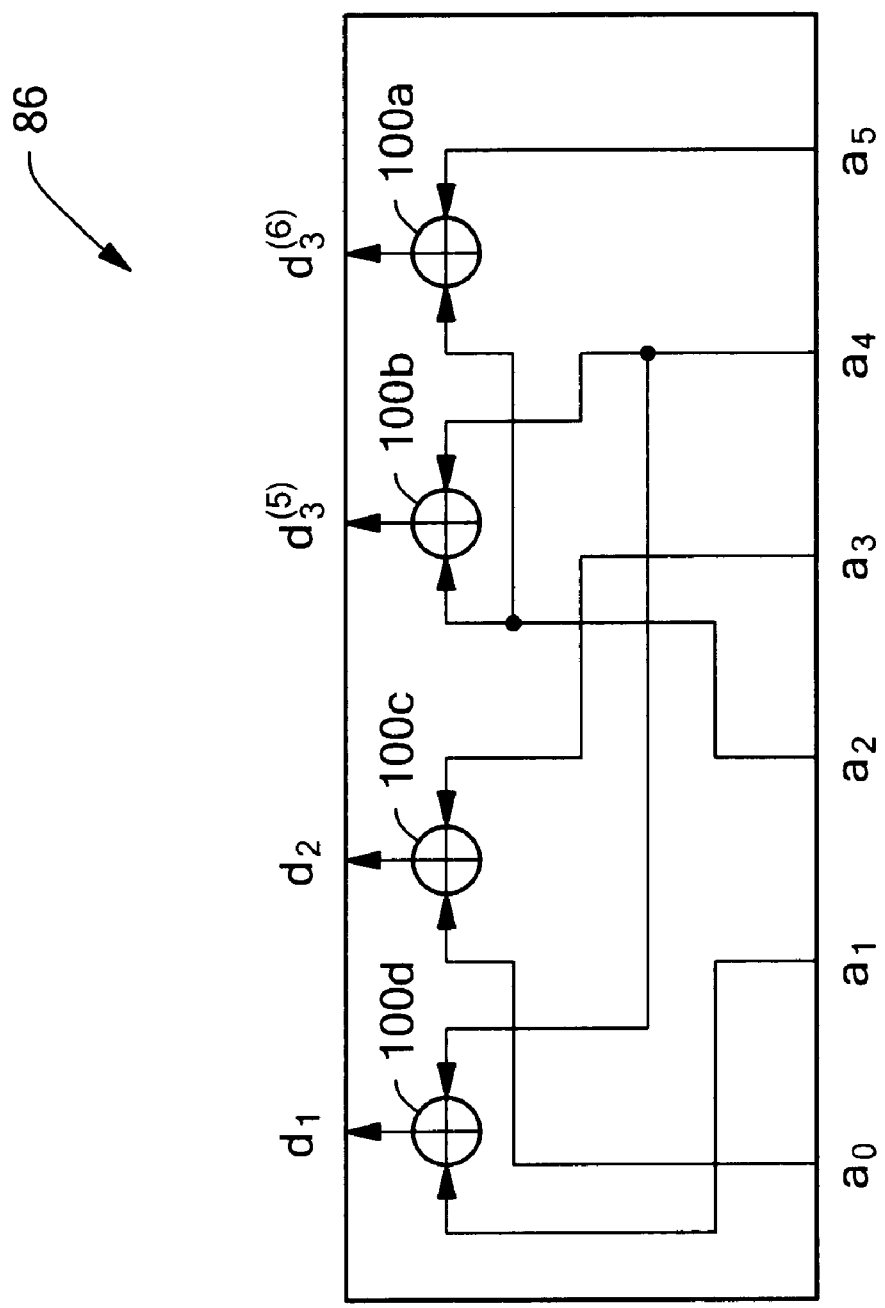
FIGS. 11–18 illustrate in detail the various logic circuits of the base multiplier shown in FIG. 7.

Referring to FIG. 11, the d compute logic 86 includes adders (i.e., exclusive ORs) 100a through 100d. The adder 100a XORs $a_2$ and $a_5$ to produce $d_3^{(6)}$. The adder 100b XORs $a_2$ and $a_4$ to produce $d_3^{(5)}$. The adder 100c XORs $a_0$ and $a_3$ to produce $d_2$. The adder 100d XORs $a_1$ and $a_4$ to produce $d_1$.

Figure 12:
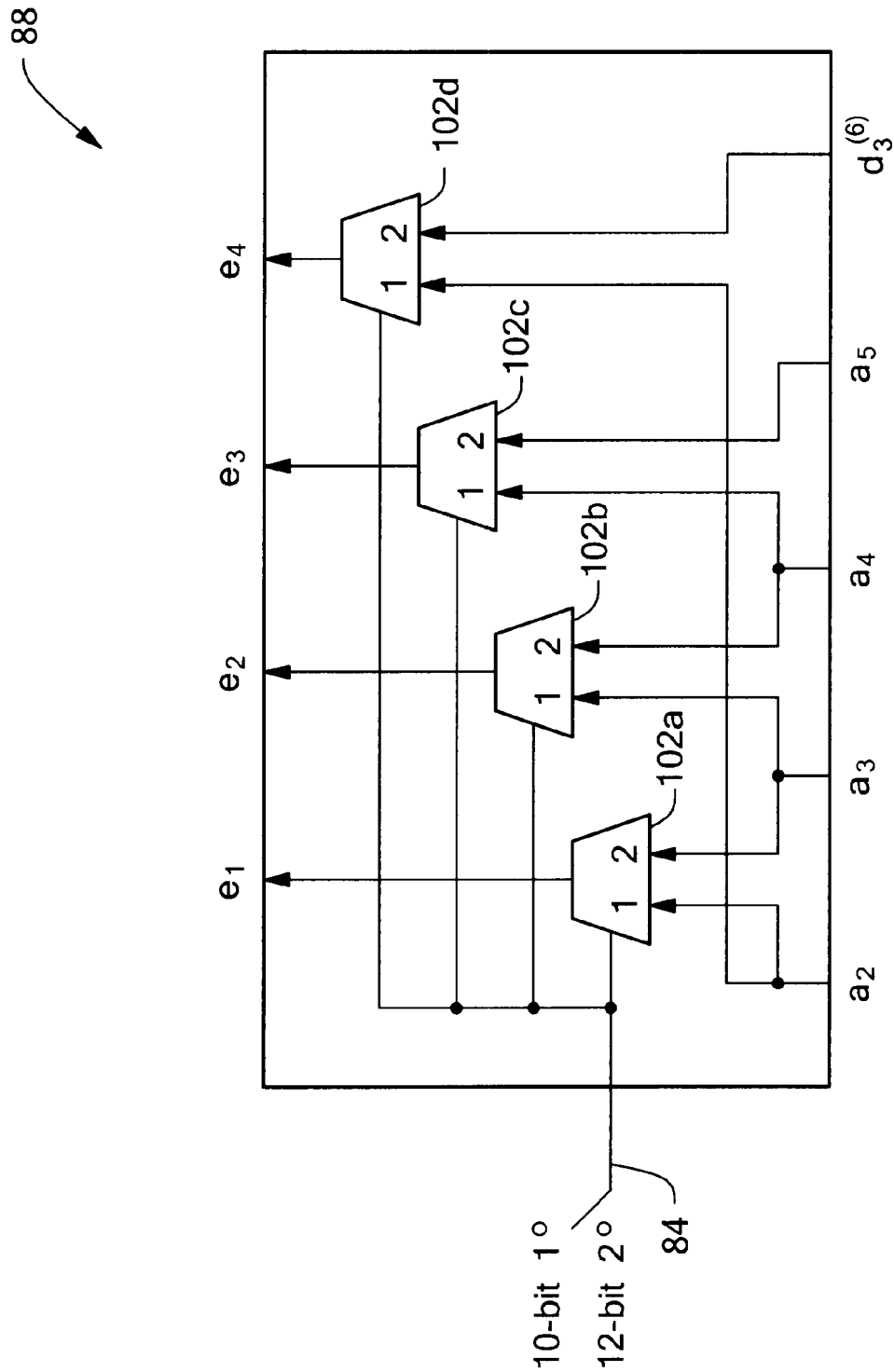

Referring to FIG. 12, the e compute logic 88 includes selectors 102a, 102b, 102c and 102d, all coupled to the control line 84. When the control line 84 defines the 10-bit mode, the selector 102a operates to select input $a_2$ as output $e_1$, the selector 102b selects $a_3$ as $e_2$, the selector 102c selects $a_4$ as $e_3$ and the selector 102d selects $a_2$ as $e_4$. When the control line 84 selects the 12-bit mode, the selector 102a selects $a_3$ as $e_3$, the selector 102b selects $a_4$ as $e_2$, the selector 102c selects $a_5$ as $e_3$, and the selector 102d selects $d_3^{(6)}$ as $e_4$.

Figure 13:
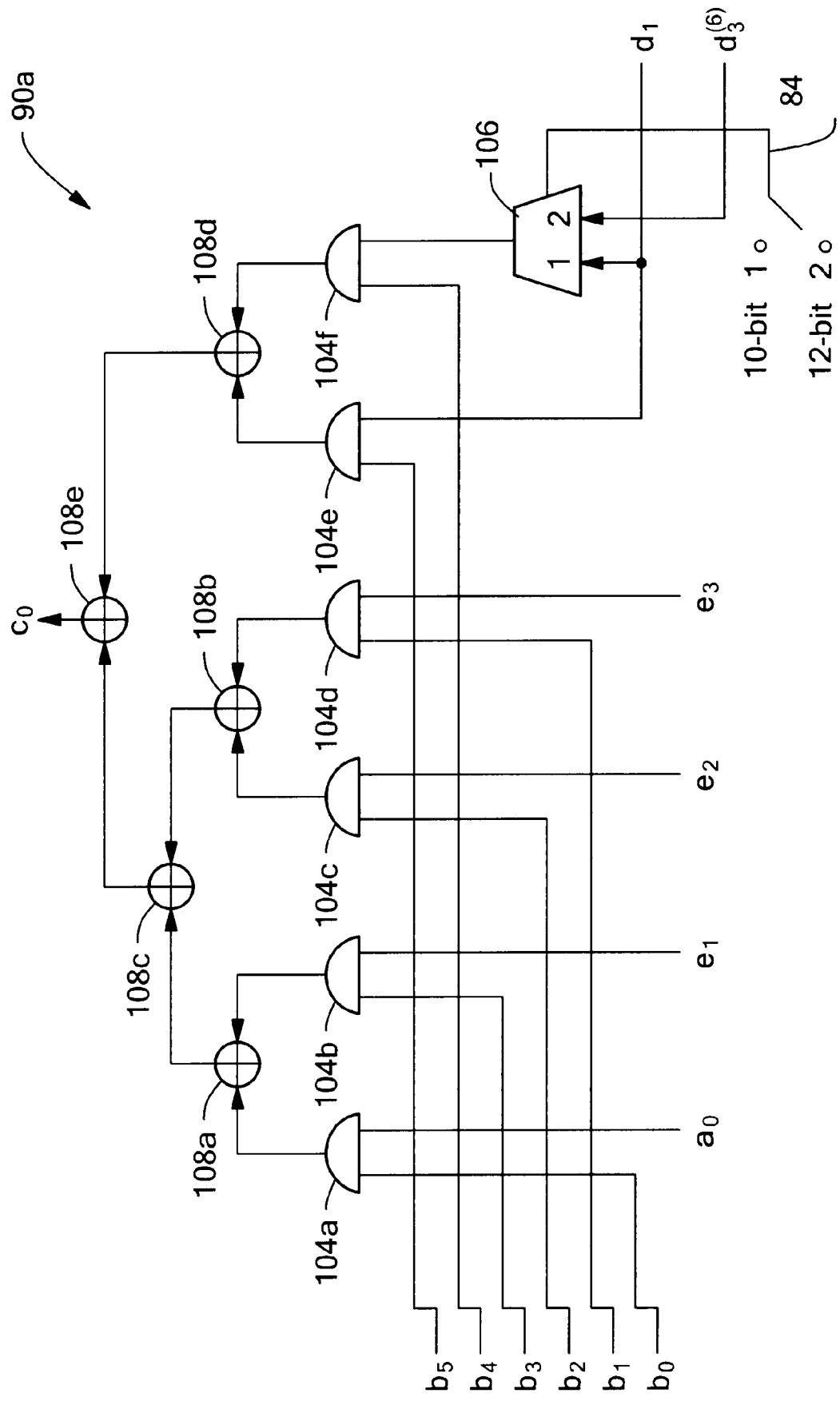

Referring to FIG. 13, the $c_o$ compute logic 90a includes six AND gates 104a, 104b, 104c, 104d, 104e, 104f, and a MUX 106. Also included are five XOR gates 108a, 108b, 108c, 108d, and 108e. The AND gate 104a receives as inputs $b_o$ and $a_o$. The output of the AND gate 104a is connected to the adder 108a, which XORs that output to the output of AND gate 104b. The AND gate 104b logically ANDs inputs $b_3$ and $e_1$. The adder 108b XORs the outputs of AND gates 104c, which ANDs $b_2$ and $e_2$, and 104d, which ANDs $b_1$ and $e_3$. The XOR 108d receives the output of the AND 104e, which is coupled to $b_5$ and $d_1$, as well as the output of AND gate 104f, which receives as inputs $b_4$ and the output of the mux 106. The mux 106 receives as inputs $d_1$ and $d_3^{(6)}$. The MUX 106 receives as a select the control line 84. When control line 84 has the 10-bit mode selected, the mux 106 selects $d_1$. In the 12-bit mode, mux 106 selects $d_3^{(6)}$. The XOR gate 108c XORs the outputs of the XOR gates 108a and 108b. The XOR gate 108d XORs the outputs of AND gates 104e and 104f. The XOR gate 108e XORs the outputs of the XOR gates 108c and 108d to produce output value $c_o$.

Figure 14:
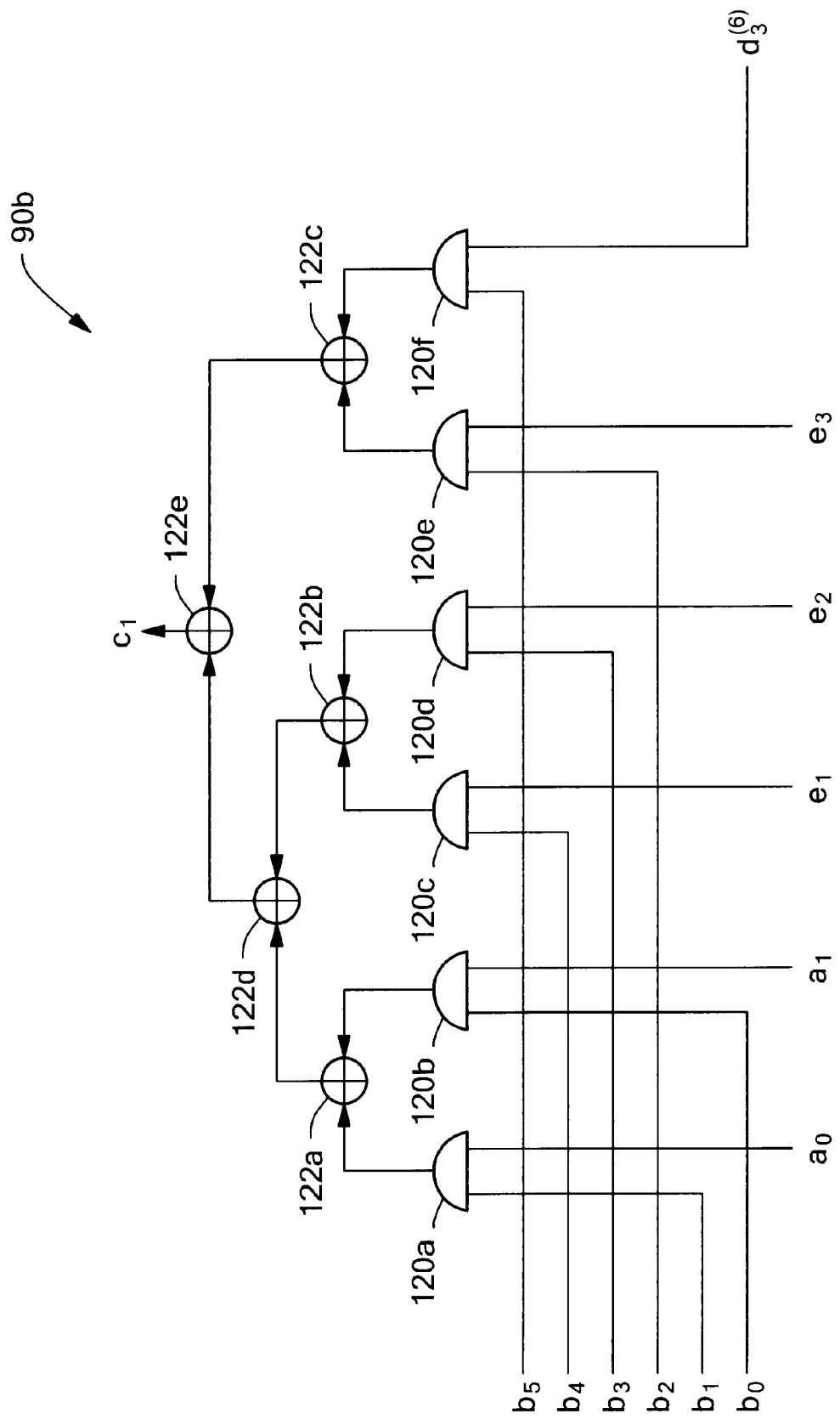

Referring to FIG. 14, the $c_1$ compute logic 90b includes six AND gates 120a, 120b, 120c, 120d, 120e and 120f. Also included are five XOR gates 122a, 122b, 122c, 122d, and 122e. The XOR gate 122e XORs the outputs of XORs 122d and 122e to produce $c_1$. The XOR gate 122d XORs the outputs of the XOR gates 122a and 122b. The XOR gate 122a XORs the outputs of AND gates 120a and 120b. The AND 120a gate receives as inputs $b_1$ and $a_0$. The AND gate 120b receives as inputs $b_o$ and $a_1$. The XOR gate 122b XORs the outputs of AND gates $120_c$ and $120_d$. The AND gate 120c receives as inputs $b_4$ and $e_1$. The AND gate 120d receives as inputs $b_3$ and $e_2$. The XOR gate 122c XORs the AND gates 120e and 120f. The AND gate 120e is coupled to inputs $b_2$ and $e_3$. The AND gate 120f is coupled to inputs $b_5$ and $d_3^{(6)}$.

Figure 15:
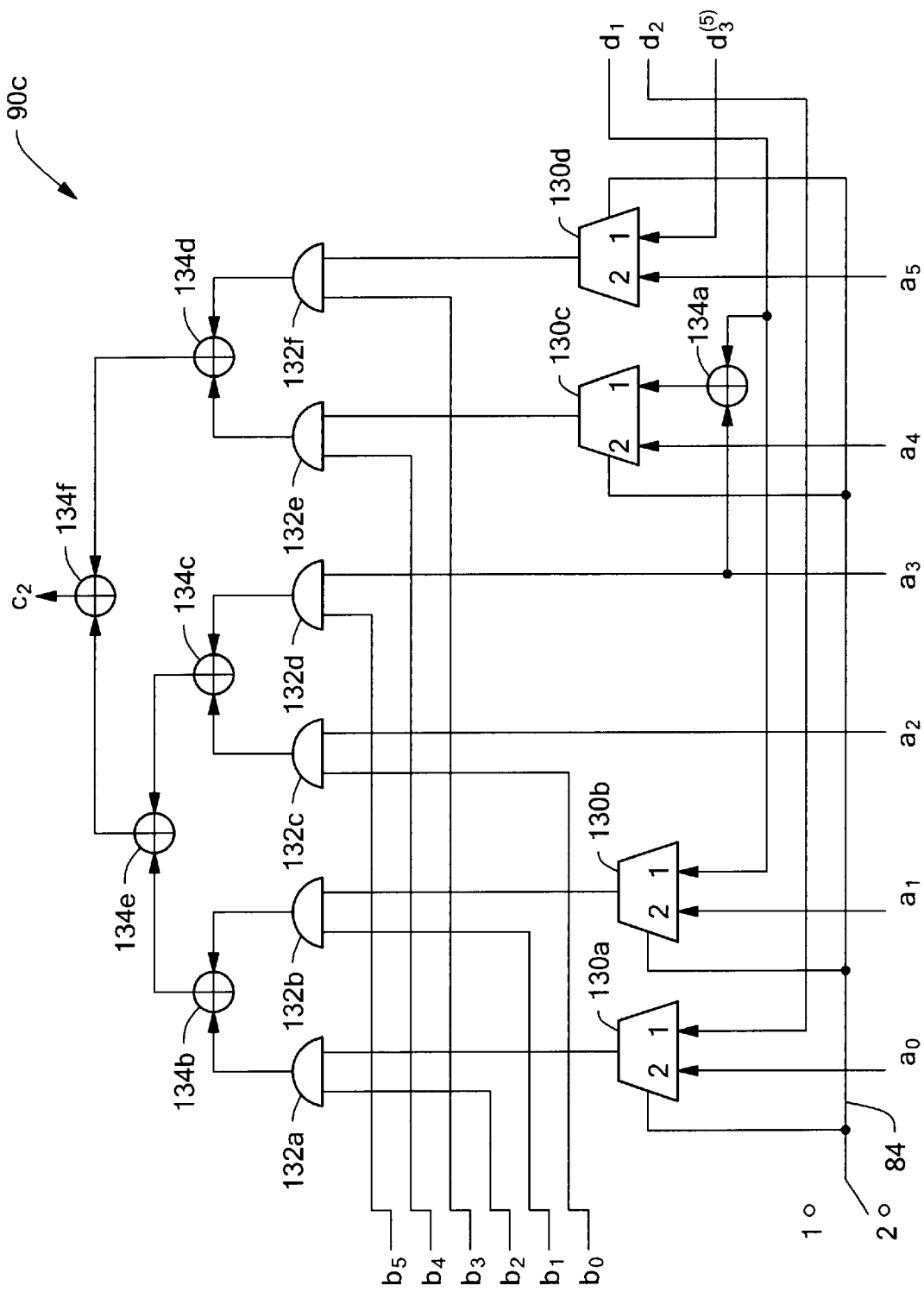

Referring to FIG. 15, the $c_2$ compute logic 90c includes four MUXes 130a, 130b, 130c and 130d, all coupled the control line 84, six AND gates 132a, 132b, 132c, 132d, 132e, 132f, and six XOR gates 134a, 134b, 134c, 134d, 134e, and 134f. The XOR gate 134f XORs the outputs of XOR gates 134d and 134e to produce $c_2$. The XOR gate 134e XORs the outputs of XOR gates 134b and 134c. The XOR gate 134b XORs the outputs of the AND gates 132a and 132b. The AND gate 132 a receives as inputs $b_2$ and the output of the mux 130a, controlled to generate as an output $a_0$ for 12-bit mode and $d_2$ for 10-bit mode. The AND gate 132b receives as inputs $b_1$ and the output of the mux 130b, which is controlled to select as its output the input $a_1$ for 12-bit mode and the input $d_1$ for 10-bit mode. The AND gate 132c receives inputs $b_o$ and $a_2$. The AND gate 132d receives as inputs $b_5$ and $a_3$. The AND gate 132e receives as inputs $b_4$ and the output of the mux 130c, which is controlled to select input $a_4$ in 12-bit mode and the XOR sum produced by the XOR gate 134b of inputs $a_3$ and $d_1$ in 10-bit mode. The AND gate 132f receives as inputs $b_3$ and the output of the mux 130d, which is controlled to select $a_5$ in 12-bit mode and $d_3^{(5)}$ in 10-bit mode.

Figure 16:
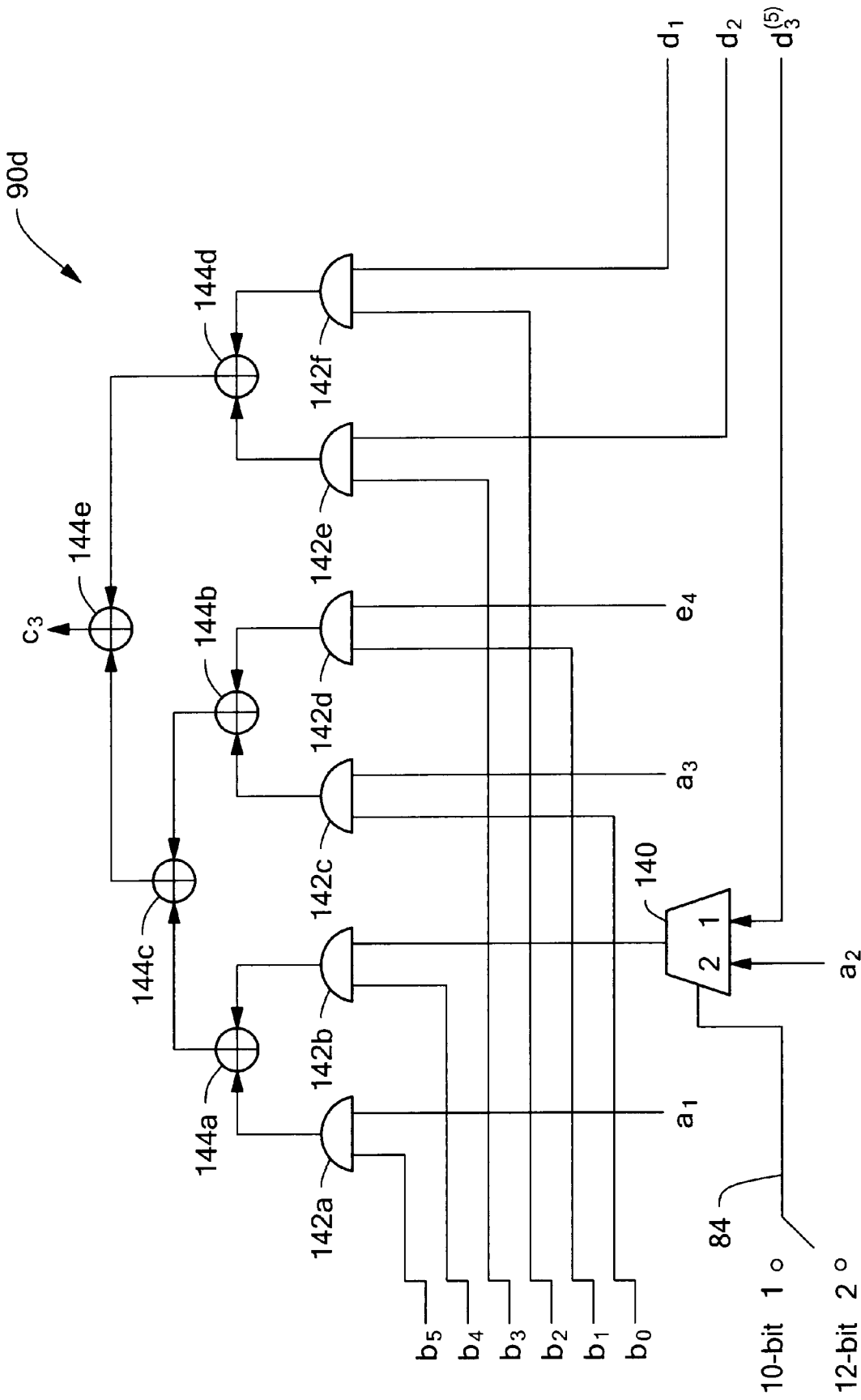

Referring to FIG. 16, the $c_3$ compute logic 90d includes a mux 140, which is coupled to and controlled by control line 84, six AND gates 142a, 142b, 142c, 142d, 142e, 142f, and five XOR gates 144a, 144b, 144c, 144d and 144e. The XOR gate 144e XORs the outputs of XOR gates 144c and 144d. The XOR gate 144c XORs the outputs of XOR gates 144a and 144b. The XOR gate 144a XORs the outputs of the AND gates 142a, which produces $b_5*a_1$ and 142b, which generates a product from inputs $b_4$ and the selected output of the mux 140—$a_2$ in 10-bit mode and $d_3^{(5)}$ in 12-bit mode. The AND gate 142c generates the product $b_0*a_3$ and the AND gate 142d generates the product $b_1*e_4$. The AND gate 142e generates the product $b_3*d_2$ and the AND gate 142f produces the product $b_2*d_1$.

Figure 17:
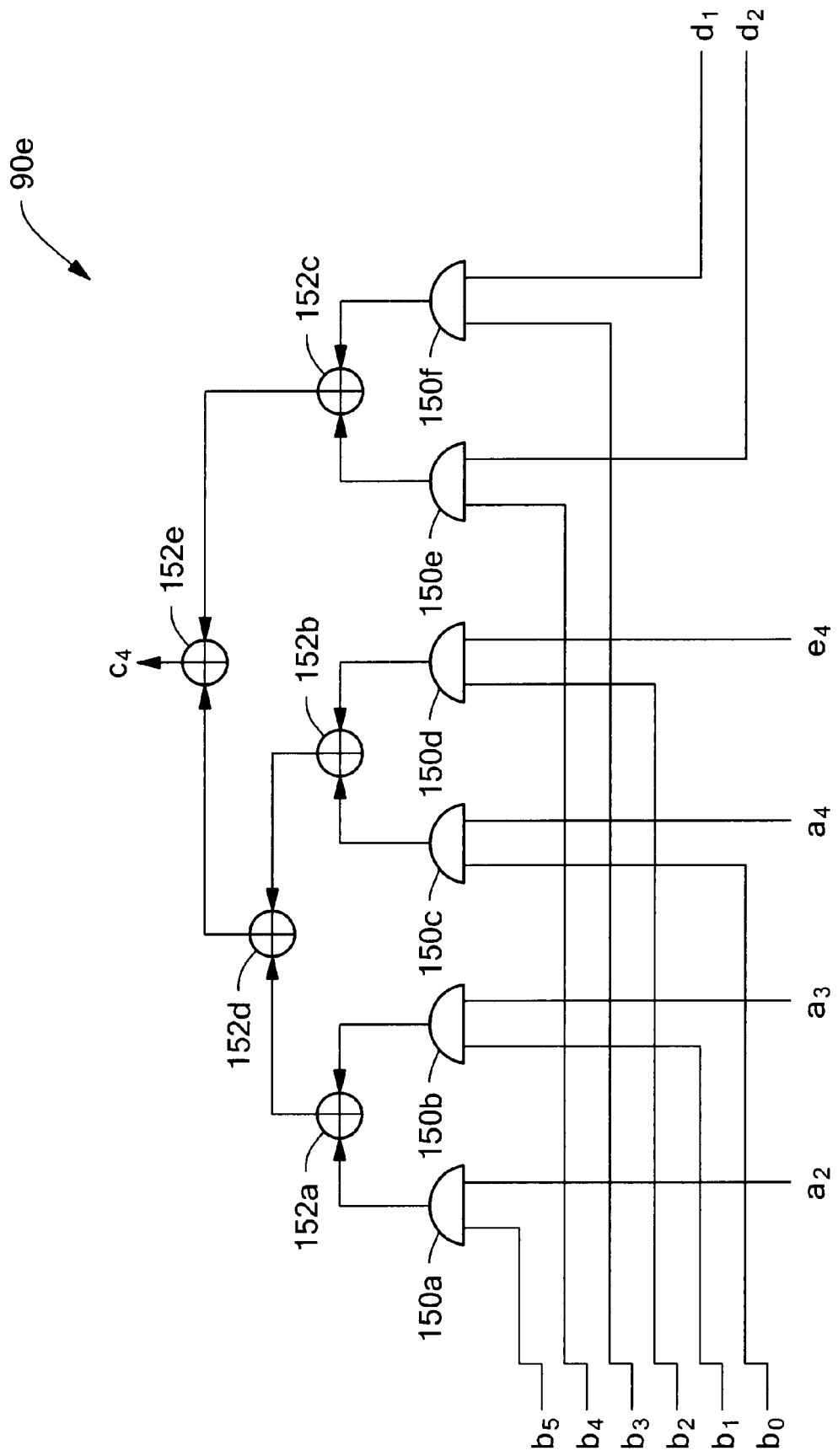

Referring to FIG. 17, the $c_4$ compute logic 90e includes six AND gates 150a, 150b, 150c, 150d, 150e, 150e, 150f, and five XOR gates 152a, 152b, 152c, 152d, and 152e. The XOR gate exclusive-ORs the outputs of XOR gates 152d and 152c. The XOR gate 152d XORs the outputs of XOR gates 152a and 152b. The XOR gate 152a XORs the outputs of the AND gates 150a, which has as its inputs $b_5$ and $a_2$, and 150b, which has for inputs $b_1$ and $a_3$. The XOR gate 152b, in conjunction with AND gates 150c and 150d, computes $b_0*a_4+b_2*e_4$. The XOR gate 152c adds product $b_4*d_2$ (from the AND gate 150e) and product $b_3*d_1$ (from the AND gate 150f).

Figure 18:
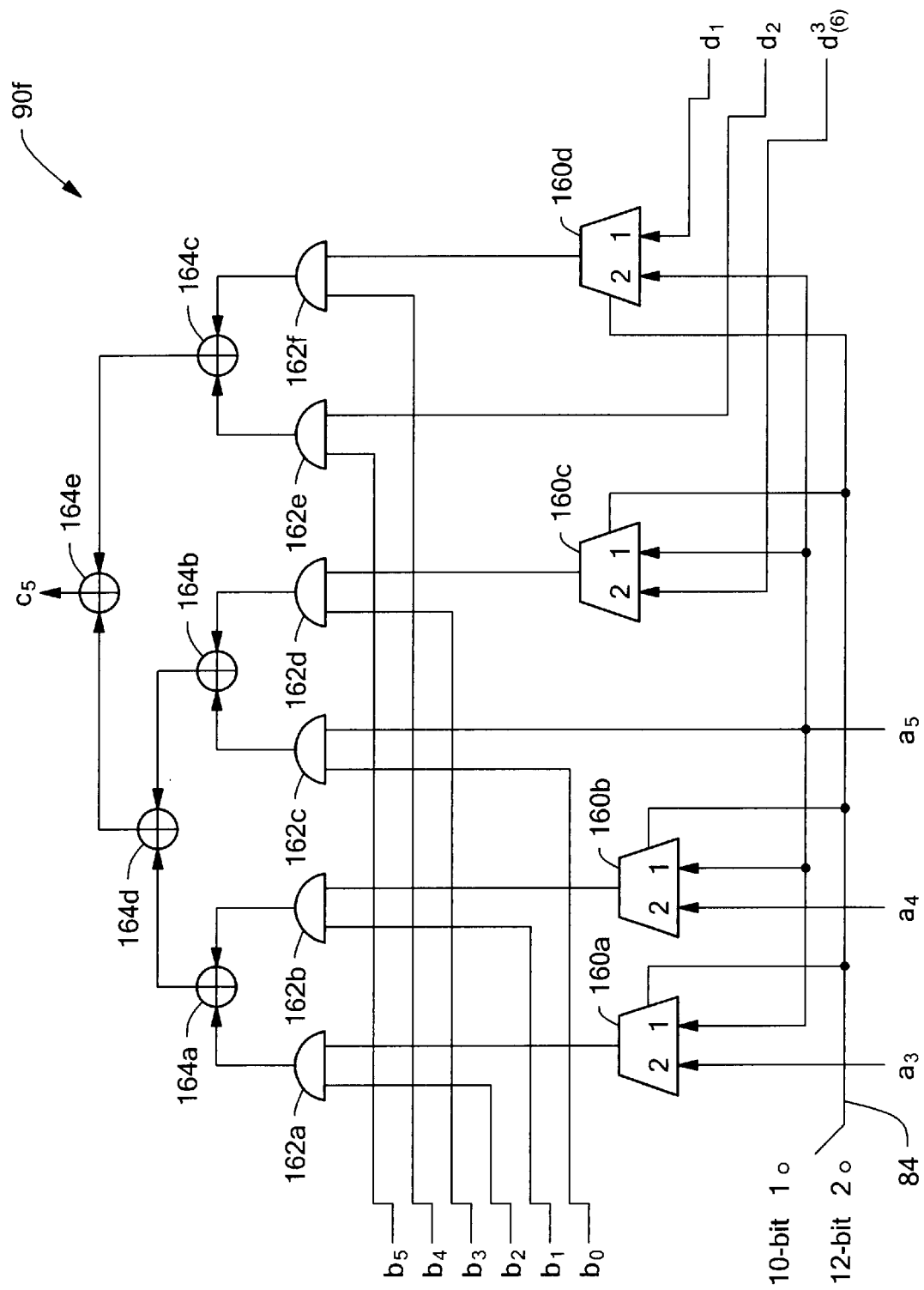

Referring to FIG. 18, the $c_5$ compute logic 90f includes four muxes 160a, 160b, 160c, 160d, all coupled to the control line 84, six AND gates 162a–162f, as well as four XOR gates 164a–164d. The XOR gate 164e XORs the outputs of the XOR gates 164d and 164c. The XOR gate 164d XORs the outputs of XOR gates 164a and 164b. The XOR gate 164c XORs the outputs of AND gates 162e and 162f. The AND gate 162e receives as inputs $b_4$ and $d_2$. The AND gate 162f ANDs inputs $b_4$ and the output of the mux 160d, which selects as that output input $a_5$ if control line 84 selects 12-bit and input $d_1$ if control line 84 selects 10-bit. The XOR gate 164a XORs the outputs of AND gates 162a and 162b, and the XOR gate 164b XORs the AND gates 162c and 162d. The AND gate 162a receives as inputs $b_2$ and the output of the mux 160a, which is $a_5$ for 10-bit symbol inputs and $a_3$ for 12-bit symbol inputs (as determined by control line 84). The AND gate 162b receives as inputs $b_1$ and the output of the mux 160b. The 160b mux output is determined by control line 84 to be $a_4$ for 12-bit mode and $a_5$ for 10-bit mode. The AND gate 162c receives as inputs $b_0$ and $a_5$. The AND gate 162d receives as inputs $b_3$ and the output of the mux 160c. As with the other muxes, the output of mux 160c is selected by the control line 84. In 12-bit mode, the output of mux 160c is $d_3^{(6)}$. In 10-bit mode, the output of mux 160c is $a_5$.

Figures 19, 20, 21:
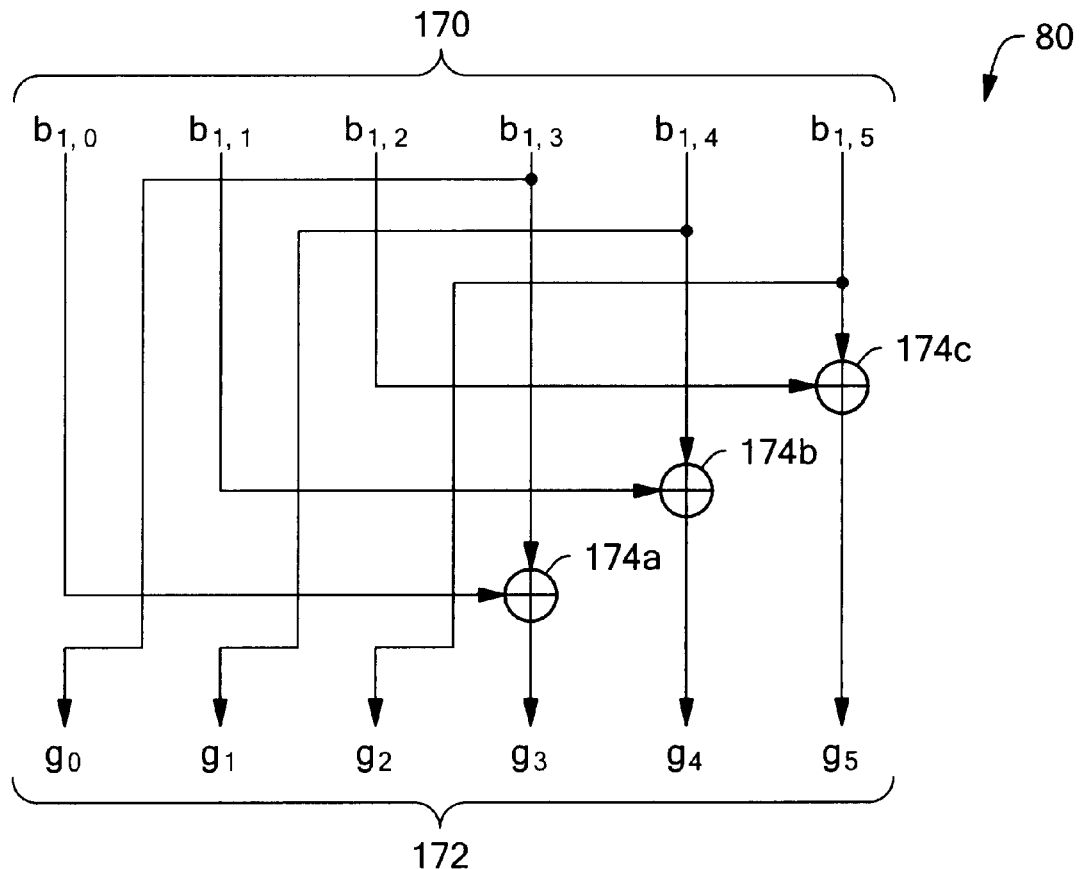
FIG. 19 is a schematic diagram of the constant multiplier of the shared-field multiplier shown in FIG. 7.
FIGS. 20–21 are tables depicting the gate count and delay associated with the 10-bit and the 12-bit composite field multipliers, respectively.

The constant field multiplier 80 (from FIG. 7) is shown in detail in FIG. 19. Referring to FIG. 19 along with Eq. (6), the constant field multiplier 80 forms the product $B_1*\alpha_6^{42}$ by receiving constant multiplier inputs $b_{1,0}, \ldots b_{1,5}$ 170 and produces as outputs $g_o, g_1, \ldots, g_5$ 172, which correspond to $b_{1,3}, b_{1,4}, b_{1,5}, b_{1,3}+b_{1,0}, b_{1,4}+b_{1,1}, b_{1,5}+b_{1,2}$, respectively As shown, $b_{1,3}$ is XORed with $b_{1,0}$ by a first XOR 174a, $b_{1,4}$ is XORed with $b_{1,1}$ by a second XOR 174b, and $b_{1,5}$ is XORed with $b_{1,2}$ by a third XOR 174c.

The gate count and delay for the base multiplier 76 is shown in the table of FIG. 20. The total number of gates is 85 and the total delay is 6.

The total gate count and delay for the shared field multiplier 30 (of FIG. 7) is provided in the table of FIG. 21. The total gate count is 288 and the associated delay is 8. In a two single field multiplier design, the gate count of the single field 10-bit multiplier is 75 AND and 95 XOR, and the gate count of the single-field 12-bit multiplier is 108 AND and 132 XOR. For a single chip design, the gate count increase for the shared-field multiplier will be 71% in comparison to a single-field 12-bit multiplier. In contrast, using the shared field multiplier shown in FIG. 7, the gate count increase is 30%, with an increase in latency of 15%.

Figure 22:
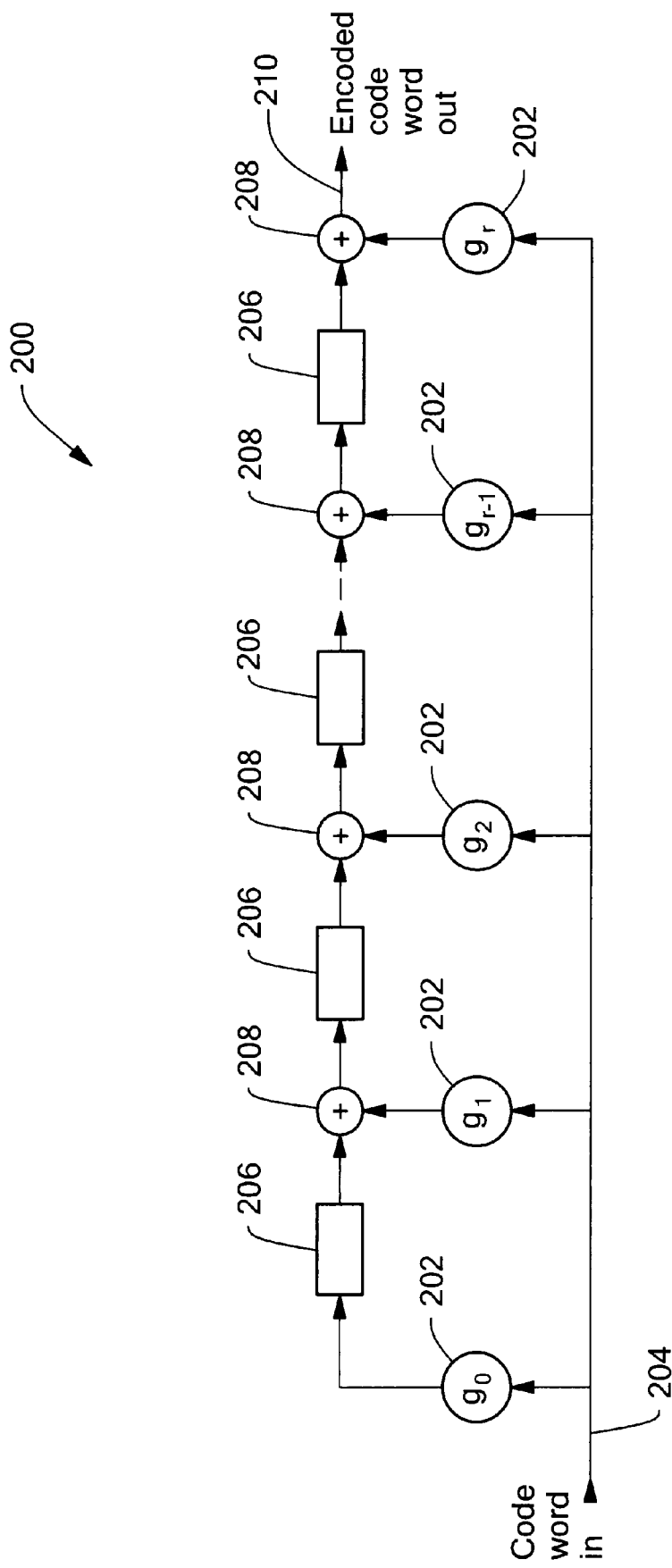
FIG. 22 is a block diagram of an exemplary encoder which includes a plurality of field multipliers that may be implemented as the shared field multiplier of either FIG. 3 or FIG. 7.

The shared field multipliers 30, 70 of FIGS. 4 and 7, respectively, can be employed as either general or constant multipliers by conventional encoders and decoders. For example, and referring to FIG. 22, a simple, conventional encoder 200 includes constant Galois field multipliers 202 which multiply each of the coefficients of a generator polynomial G(x) by a polynomial coefficient corresponding to each code word symbol of a code word input 204. Collectively, the multipliers 202, along with shift register stages 206 and adders 208, operate to produce an encoded code word output 210 from the code word input 204. A detailed description of this type of encoder, along with alternative encoder implementations, all of which utilize field multipliers for fixed polynomial multiplication and/or division, can be found in the Peterson and Weldon book, as well as other texts.

Figure 23:
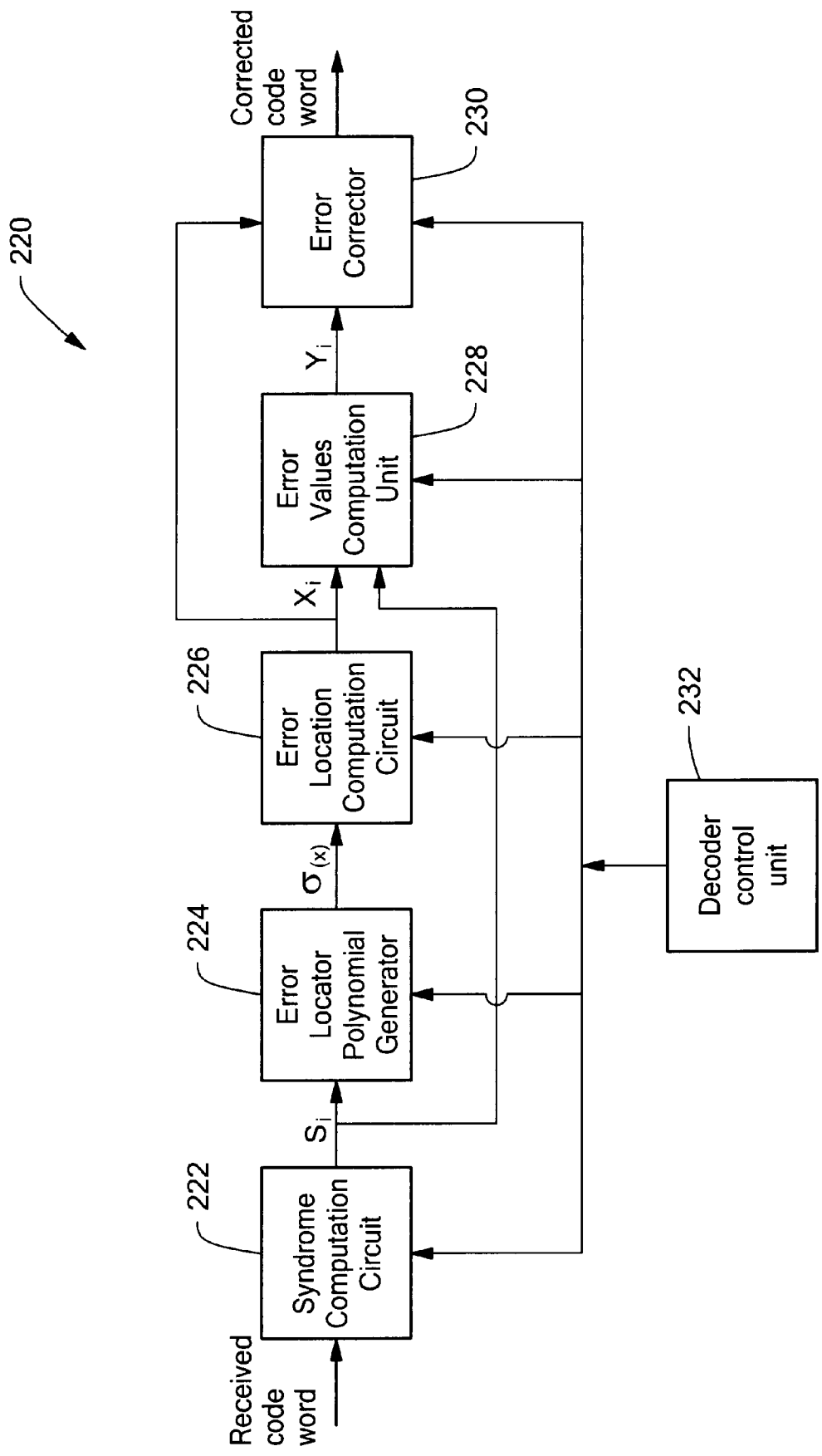
FIG. 23 is a block diagram of an exemplary decoder having functional units which may perform Galois field multiplication using the shared field multiplier of either FIG. 4 or FIG. 7.

In another example, and referring to FIG. 23, a conventional decoder shown as a Reed-Solomon decoder 220, may use a combination of general and constant field multipliers, both of which may be implemented as the shared field multipliers for handling either 10-bit or 12-bit field multiplication. The conventional decoder 220 for receiving an erroneous code word and producing a corrected code word includes a syndrome computation unit 222, an error locator polynomial generator 224, an error location computation (or root finding) circuit 226, and error value computation unit 228, and an error corrector 230. Control of each of the units is effected by a decoder control unit 232.

The decoder 220 typically uses general multipliers in performing algorithms of the error locator polynomial generator 224, or constant (fixed polynomial) field multipliers in the syndrome computation circuit 222 and error location computation circuit 226. Examples of such decoding circuits that employ constant field multipliers are described in a U.S. application Ser. No. 09/327,285, entitled "Determining Error Locations Using Error Correction Codes", in the name of Lih-Jyh Weng, incorporated herein by reference. Additional details of these circuits, along with general (polynomial) multiplications of the type used to generate error locator polynomials, for example, the well-known Euclidean and Berlekamp-Massey algorithms, can be found in the aforementioned book by Peterson and Weldon, as well as U.S. Pat. No. 5,107,503, issued to Riggle et al., also incorporated herein by reference, as well as many other sources.

Although the cyclic and composite shared field multipliers have been described with respect to a 10-bit/12-bit implementation, they may be suitably modified for use with field elements of other sizes. A cyclic shared field multiplier of the type described above could be designed for elements of other cyclic fields, e.g., 12-bit/18-bit or 18-bit/28-bit. Other values of m for cyclic Galois fields $GF(2^m)$ are discussed in the above-referenced Wolf paper. The composite shared field multiplier concept could be extended to other field element sizes as well, e.g., 12-bit/14-bit or 14-bit/16-bit, to name but a few combinations. Also, the shared field multiplier could conceivably be shared by more than two different field element sizes, e.g., a composite field multiplier could be designed to support three different field element sizes (such as 10-bit/12-bit/14-bit).

What is claimed is:

1. A Galois field multiplier comprising:

computation circuitry for receiving an input;

the computation circuitry being responsive to a control signal to perform computations based on the input having a first size to produce an output of the first size, or to perform computations based on the input having a second, different size to produce an output of the second size, the computation circuitry comprising shifting circuitry only for performing a cyclic shifting of bits of the input, the shifting circuitry comprising a single shifting circuit for use with both the input having the first size and the input having the second size.

2. The Galois field multiplier of claim 1, wherein the computation circuitry comprises:

select circuitry, responsive to the control signal, for configuring the computation circuitry.

3. The Galois field multiplier of claim 2, wherein the input is an element of a cyclic Galois field and wherein the shifting circuitry is coupled to and responsive to the select circuitry.

4. The Galois field multiplier of claim 3, wherein the first size is 10 bits and an associated input is an element of the cyclic Galois field $GF(2^{10})$.

5. The Galois field multiplier of claim 4, wherein the cyclic Galois field $GF(2^{10})$ is generated by the irreducible polynomial $r_{10}(x)=1+x+x^2+X^3+x^4+x^5+x^6+x^7+x^8+x^9+x^{10}$.

6. The Galois field multiplier of claim 3, wherein the second size is 12 bits and an associated input is an element of the cyclic Galois field $GF(2^{12})$.

7. The Galois field multiplier of claim 6, wherein the cyclic Galois field $GF(2^{12})$ is generated by the irreducible polynomial $r_{12}(x)=1+x+x^2+X^3+x^4+x^5+x^6+x^7+x^8+x^9+x^{10}+x^{11}+x^{12}$.

8. The Galois field multiplier of claim 3, wherein the shifting circuitry further comprises:

a plurality of shifting units connected in parallel, a first one of the shifting units for receiving input values for input and cyclically shifting the input values, each next consecutive one of the other shifting units receiving a cyclically shifted output from a previous one of the shifting units and cyclically shifting the cyclically shifted output.

9. The Galois field multiplier of claim 8, wherein the input is a first input and the computation circuitry further receives a second input of the same size as the first input and has second input values, further comprising:

a plurality of AND gates, each of the AND gates coupled to a one of the second input values of the second input, a least significant one of the AND gates coupled to the received input values of the input, a next most significant one of the AND gates coupled to cyclically shifted output of the first one of the shifting units, and each next most significant one of the AND gates coupled to and receiving a cyclically shifted output from the next consecutive one of the other shifting units to form product values; and a plurality of Galois field adders, one adder for each of the input values, each adder for receiving one of the product values for a corresponding one of the input values from each of the AND gates, for producing a set of multiplier output values of the output.

10. The Galois field multiplier of claim 2, wherein the input is a first input and the computation circuitry further receives a second input of the same size as the first input, wherein the first and second inputs are elements of an extended Galois field $GF((2^m)^k)$ over a field $GF(2^m)$.

11. The Galois field multiplier of claim 10, wherein m=5 and k=2.

12. The Galois field multiplier of claim 10, wherein m=6 and k=2.

13. The Galois field multiplier of claim 10, wherein the computation circuitry is implemented to compute the product of the first and second inputs using the Karatsuba-Ofman algorithm and further comprises:

a plurality of base multipliers coupled to the control line, each of the base multipliers for performing multiplications over the field $GF(2^m)$.

14. The Galois field multiplier of claim 13, wherein each of the plurality of base multipliers includes base multiplier computation circuitry for receiving base multiplier inputs to produce base multiplier outputs, the base multiplier computation circuitry being responsive to the control signal.

15. An encoder comprising:

a plurality of field multipliers for receiving code word symbol inputs and multiplying the received code word symbol inputs by generator polynomial constant values; and wherein each of the plurality of field multipliers includes computation circuitry for receiving the code word symbol inputs, the computation circuitry being responsive to a control signal to perform computations based on the code word symbols inputs having a first size to produce an output of the first size, or to perform computations based on the code word symbol inputs having a second, different size to produce an output of the second size.

16. The encoder of claim 15, wherein the first and second sizes comprise Galois field sizes.

17. The encoder of claim 16, wherein the first size comprises 10 bits and the second size comprises 12 bits.

18. The encoder of claim 15, wherein the code word symbol inputs are derived based on an irreducible polynomial.

19. The encoder of claim 18, wherein the irreducible polynomial contains only coefficient values of "1".

20. The encoder of claim 15, wherein the computation circuitry comprises:

select circuitry, responsive to the control signal, for configuring the computation circuitry.

21. The encoder of claim 20, wherein each code word symbol input comprises elements of a cyclic Galois field and wherein the computation circuitry further comprises:

shifting circuitry, coupled to and responsive to the select circuitry, for performing a cyclic shifting of bits of the code word symbol input.

22. The encoder of claim 15, wherein the first size is 10 bits and a code word symbol input is an element of a cyclic Galois field $GF(2^{10})$.

23. The encoder of claim 22, wherein the cyclic Galois field $GF(2^{10})$ is generated based on irreducible polynomial $r_{10}(x)=1+x+x^2+x^3+x^4+x^5+x^6+x^7+x^8+x^9+x^{10}$.

24. The encoder of claim 15, wherein the second size is 12 bits and a code word symbol input is an element of a cyclic Galois field $GF(2^{12})$.

25. The encoder of claim 24, wherein the cyclic Galois field $GF(2^{12})$ is generated based on an irreducible polynomial $r_{12}(x)\ 1+x+x^2+x^3+x^4+x^5+x^6+x^7+x^8+x^9+x^{10}+x^{11}+x^{12}$.

26. The encoder of claim 15, wherein the computation circuitry comprises:

a plurality of shifting units connected in parallel, a first one of the shifting units for receiving input values for the code word symbol input and cyclically shifting the input values, each next consecutive one of the shifting units receiving a cyclically shifted output from a previous one of the shifting units and cyclically shifting a cyclically shifted output.

27. The encoder of claim 26, wherein the input values comprise a first input and the computation circuitry further receives a second input of the same size as the first input and has second input values, the computation circuitry further comprising:

a plurality of AND gates, each of the AND gates coupled to one of the second input values of the second input, a least significant one of the AND gates coupled to received input values of an input, a next most significant one of the AND gates coupled to cyclically shifted output of the first one of the shifting units, and each next most significant one of the AND gates coupled to and receiving a cyclically shifted output from a next consecutive one of the other shifting units to form product values; and a plurality of Galois field adders, one adder for each of the input values, each adder for receiving one of the product values for a corresponding one of the input values from each of the AND gates, for producing a set of multiplier output values of the output.

28. A decoder comprising:

functional units for performing decoding computations;

wherein at least one of the functional units employs a plurality of field multipliers for performing multiplication associated with at least one of the decoding computations; and wherein each of the plurality of field multipliers includes computation circuitry for receiving inputs, the computation circuitry being responsive to a control signal to perform computations based on the inputs having a first size to produce an output of the first size, or to perform computations based on the inputs having a second, different size to produce an output of the second size.

29. The decoder of claim 28, wherein the multiplication is a general multiplication of two polynomial inputs.

30. The decoder of claim 29, wherein the at least one of the decoding computations is a Berlekamp-Massey computation for computing error locator polynomials.

31. The decoder of claim 29, wherein the at least one of the decoding computations is a Euclidean algorithm for computing error locator polynomials.

32. The decoder of claim 28, wherein the multiplication is a constant multiplication of a polynomial by a constant.

33. The decoder of claim 32, wherein the at least one of the decoding computations is a syndrome computation.

34. The decoder of claim 32, wherein the at least one of the decoding computations is a root finding computation.

35. The decoder of claim 28, wherein the first and second sizes comprise Galois field sizes.

36. The decoder of claim 28, wherein the first size comprises 10 bits and the second size comprises 12 bits.

37. A Galois field multiplier comprising:

computation circuitry for receiving an input;

the computation circuitry being responsive to a control signal to perform computations based on the input having a first size to produce an output of the first size, or to perform computations based on the input having a second, different size to produce an output of the second size, the input comprising an element of a cyclic Galois field;

the computation circuitry further comprising:

select circuitry, responsive to the control signal, for configuring the computation circuitry; and shifting circuitry, coupled to and responsive to the select circuitry, for performing a cyclic shifting of bits of the input, the shifting circuitry including a plurality of shifting units connected in parallel, a first one of the shifting units for receiving input values for the input and cyclically shifting the input values, each next consecutive one of the other shifting units receiving a cyclically shifted output from a previous one of the shifting units and cyclically shifting cyclically shifted output.

38. The Galois field multiplier of claim 37, wherein the input is a first input and the computation circuitry further receives a second input of the same size as the first input and has second input values, further comprising:

a plurality of AND gates, each of the AND gates coupled to a one of the second input values of the second input, a least significant one of the AND gates coupled to the received input values of the input, a next most significant one of the AND gates coupled to cyclically shifted output of the first one of the shifting units, and each next most significant one of the AND gates coupled to and receiving a cyclically shifted output from the next consecutive one of the other shifting units to form product values; and a plurality of Galois field adders, one adder for each of the input values, each adder for receiving one of the product values for a corresponding one of the input values from each of the AND gates, for producing a set of multiplier output values of the output.

39. A multiplier for multiplying elements of a finite field, comprising:

multiple shifting units, each of the multiple shifting units producing an output having a first size or an output having a second size; and logic elements which combine outputs of the multiple shifting units;

wherein each of the multiple shifting units comprises:

a shifting circuit which cyclically shifts inputs to the multiplier based on a size of the finite field, the shifting circuit including selecting circuitry to configure the shifting circuitry to accommodate either the first size or the second size, the selecting circuitry comprising a multiplexer and an AND gate that are responsive to a control signal indicative of the first size or the second size.

40. The multiplier of claim 39, wherein:

inputs to the shifting circuit are defined as $a_0^i, a_1^i, a_2^i, a_3^i, a_4^i, a_5^i, a_6^i, a_7^i, a_8^i, a_9^i, a_{10}^i, a_{11}^i$ and $a_{12}^i$;

outputs to the shifting circuit are defined as $a_0^o, a_1^o, a_2^o, a_3^o, a_4^o, a_5^o, a_6^o, a_7^o, a_8^o, a_9^o, a_{10}^o, a_{11}^o$ and $a_{12}^o$; and cyclic shifting performed by the shifting circuit comprises:

when the control signal indicates the first size, $a_{11}^o$ and $a_{12}^o$ outputs are not used and $a_{10}^i$ input is connected to $a_0^o$ output via the multiplexer; and when the control signal indicates the second size $a_{12}^i$ input is connected to $a_0^o$ output via the multiplexer; $a_{10}^i$ input is shifted to $a_{11}^o$ output via the AND gate, and $a_{11}^i$ input is connected to $a_{12}^o$ output.

41. The multiplier of claim 39, wherein the first size comprises 10 bits and the second size comprises 12 bits.

42. The multiplier of claim 39, wherein the multiplier is operable on cyclic Galois fields comprising a 10-bit field GF ($2^{10}$) and a 12-bit field GF ($2^{12}$) the 10-bit field being generated based on an irreducible polynomial comprising:

$$r_{10}(x)=1+x+x^2+x^3+x^4+x^5+x^6+x^7+x^8+x^9+x^{10}, \text{ and}$$

the 12-bit field being generated based on an irreducible polynomial comprising:

$$r_{12}(x)=1+x+x^2+x^3+x^4+x^5+x^6+x^7+x^8+x^9+x^{10}+x^{11}+x^{12}.$$

* * * * *